United States Patent
Greenwald et al.

(10) Patent No.: US 8,245,609 B1
(45) Date of Patent: Aug. 21, 2012

(54) REPORTING SYSTEM FOR ON-VEHICLE BRAKE LATHE

(75) Inventors: Christopher L. Greenwald, Waban, MA (US); Jeffrey P. Hastings, Hanover, NH (US)

(73) Assignee: Pro-Cut Licensing Company, LLC, West Lebanon, NH (US)

( * ) Notice: Subject to any disclaimer, the term of this patent is extended or adjusted under 35 U.S.C. 154(b) by 465 days.

(21) Appl. No.: 12/699,091

(22) Filed: Feb. 3, 2010

Related U.S. Application Data

(60) Provisional application No. 61/150,043, filed on Feb. 5, 2009.

(51) Int. Cl.
*B23B 5/04* (2006.01)
*B23B 1/00* (2006.01)

(52) U.S. Cl. .................. 82/112; 82/1.11; 82/47; 82/118

(58) Field of Classification Search ............... 82/1.11, 82/112, 118, 47, 163; 73/462, 466; 408/8, 408/13
See application file for complete search history.

(56) References Cited

U.S. PATENT DOCUMENTS

| 5,765,457 | A  | * | 6/1998 | Meyer et al. ................. 82/112 |
| 6,101,911 | A  |   | 8/2000 | Newell et al. |
| 6,216,571 | B1 | * | 4/2001 | Newell et al. ................ 82/1.11 |
| 6,363,821 | B1 | * | 4/2002 | Greenwald et al. ........... 82/1.11 |
| 6,729,212 | B2 |   | 5/2004 | Muller |
| 7,640,832 | B2 |   | 1/2010 | Gerdes et al. |
| 7,681,478 | B2 | * | 3/2010 | Gerdes et al. ................ 82/1.11 |
| 2009/0107309 | A1 | | 4/2009 | Greenwald et al. |

* cited by examiner

*Primary Examiner* — Will Fridie, Jr.
(74) *Attorney, Agent, or Firm* — Michael J. Weins; Jeffrey E. Semprebon

(57) ABSTRACT

A reporting system, employing a microprocessor, tracks the operation of an on-vehicle brake lathe and provides records of the resurfacing operations performed by the lathe. Identification of the vehicle and wheel position of a brake disk to be resurfaced are inputted using an operator interface, and stored in a temporary memory. When tool bits of the lathe are positioned to set a depth of cut, a thickness monitor indicates the resulting thickness for the brake disk, which is compared to a minimum thickness specification for the inputted vehicle and wheel position to determine whether the disk can be resurfaced to meet the specification. If so, a cutting operation evaluator monitors a continuity checker that is responsive to contact of the tool bits and the disk to determine when the resurfacing operation is complete, at which time the collected data can be reported.

20 Claims, 13 Drawing Sheets

REPORTING SYSTEM FOR ON-VEHICLE BRAKE LATHE

FIELD OF THE INVENTION

The present invention relates to brake lathes that are mounted to a vehicle to resurface a brake disk without requiring the disk to be removed, and more particularly for a system that can track and provide reliable records of such resurfacing operations.

BACKGROUND OF THE INVENTION

Several instruments have been developed to collect data resulting from machining operations performed by brake lathes. For example, determining the separation of tool bits of the lathe, and hence the thickness of the brake disk that will result from machining the brake disk with the tool bits in their current positions, is taught for on-vehicle brake lathes in U.S. Pat. No. 6,363,821, and for bench lathes in U.S. Pat. No. 5,765,457. Both of these patents teach comparison of the indicated thickness to a selected manufacturer specification for minimum thickness to provide the lathe operator a warning of when the thickness is not large enough to meet the specification, in which case the disk should be replaced rather than resurfaced.

Another example of instrumentation to provide information on a lathe operation is taught in U.S. Publication 2009/0107309, which teaches an alignment monitor for a hub-mounted lathe that provides a real-time indication of the misalignment between an axis of the lathe and an axis of rotation of the disk as the alignment is dynamically adjusted. A comparison to a selected alignment specification can be provided to allow the lathe operator to stop the adjustment manually when the misalignment is small enough to meet the specification.

While such instruments can provide the lathe operator information regarding the current stage of the resurfacing procedure, they do not provide guidance for inexperienced lathe operators, and do not provide records of the machining operations performed by the lathe.

Instrumentation for determining when a cut is complete have been suggested. One patent that addresses completion of a cutting operation on a brake disk is U.S. Pat. No. 6,729,212, which teaches an iterative method for machining a brake disk while monitoring contact of the tool bits with the disk surfaces using electrical conductivity sensors. The method taught in the '212 patent requires multiple passes of the tool bits over the disk surface, with the depth of cut increased for each subsequent pass. This process is continued until such time as the electrical signal indicates substantially continuous contact throughout the pass, at which time the cutting operation is considered complete. This method appears to be extremely time consuming.

Another approach is taught in U.S. Pat. No. 7,640,832, which teaches monitoring either electrical contact signals or vibration signals to provide an operator with a visual and/or audio notice of when the tool bits of an on-vehicle brake lathe are in contact with the disk surfaces. The '832 patent teaches that, when such contact is lost, indicating the end of a cut, the motor of the lathe can be shut off to minimize delay before a subsequent machining operation can be conducted.

A limitation of both of the '212 and the '832 approaches is that they rely on instantaneous signals for contact, and thus may be susceptible to false indications of whether the cut is completed when the disk surfaces are irregular.

SUMMARY OF THE INVENTION

The present invention provides a lathe reporting system for an on-vehicle disk brake lathe. The lathe reporting system provides the functions of tracking the operation of the lathe, collecting and storing information to provide assistance to the lathe operator, validating that the machining process has been performed, and reporting data regarding the machining operations for all validated resurfacing operations performed using the lathe. The system can optionally provide the capacity to allow the operator of the lathe to earmark those brake disks that, if turned to remove lateral runout, would fail to comply with the minimum thickness set by the manufacturer.

The system can be configured to service either a caliper-mounted lathe or a hub-mounted lathe, and to interact with a lathe which has its own instrumentation to monitor and control certain aspects of its operation. The system provides a uniquely identified record for recording in an output database. A time stamp can be employed as a unique identifier; when the output database is remote and receives reports from multiple systems, then a site identifier can be included with the time stamp of the data to facilitate tracking the service record of the vehicle.

The system can be designed to transfer the data generated to a database at the completion of the turning of a disk, or transfer the data after the completion of the work done on the brake disks of a vehicle has been completed.

The system includes a microprocessor which communicates with an operator interface having an input interface and a display interface. The input interface allows entry of information such as vehicle identity, wheel position, and the minimum thickness permitted by the manufacturer for the disk, while the display interface allows presenting to the operator the information that is generated during the turning of the disk, and optionally presents warnings and instructional material to assist the operator in effectively carrying out the turning operation.

An addressable temporary memory communicates with the microprocessor and serves to store the vehicle data provided, including vehicle identification material such as vehicle model being processed and wheel positions identified by the operator, as well as any data that is generated during the machining of the brake disks.

The system is used with a lathe that has a thickness monitor which is responsive to the position of the tool bits and provides a rotor thickness signal that can be correlated to the separation between tool bits of the lathe, this separation being the thickness that would result from turning the disk with the tool bits so positioned. The system has a thickness signal monitor responsive to the rotor thickness signal for providing to the addressable temporary memory the rotor thickness value that would result from turning of the brake disk at the current tool bit setting. A thickness comparison routine forms part of the system and provides a comparison between the rotor thickness that would result from turning at the current tool bit setting and a minimal acceptable thickness for the rotor. The thickness comparison routine sets an "insufficient thickness" flag in the event that the thickness is less than the minimum acceptable value and reports such to the operator via operator interface.

The system is used with a lathe that has contact sensors that produce contact signals resulting from contact between the tool bits and the brake disk surfaces. There are a variety of sensors that can be employed; in some applications, it can be convenient to monitor the vibrations that result from the engagement of the tool bits with the brake disk. Independent of the nature of the particular contact sensor used, the system has a signal continuity sensor checker for processing the signals to provide current cutting status signals. While the details of the continuity checker can vary, the continuity checker processes the signals generated by the contact sensor(s) on the basis of time-averaging the signal over small intervals of time and looking for consistency in the signal values of these time-averaged segments. When the continuity checker processes signals responsive to vibrations resulting from the tool bits engaging the disk, the continuity checker processes the signals in such a manner as to provide a filter to reduce the impact of non-cutting vibrations sensed by the sensor. One such continuity checker is taught in U.S. application Ser. No. 12/639,040.

On notice that the tool bits are engaged with the disk surfaces and that the advance of the tool bits across the disk surfaces has been initiated, it is preferred to provide a check of whether the "insufficient thickness" flag has been set and, if so, present an advisory to the operator that the cutting should be stopped and the disk replaced with a new disk. This will avoid continued machining of the failed disk and provide a partially-machined disk as confirmation that the disk has failed, leaving a portion of the failed disk unmachined to preserve the surface for further study by the manufacturer.

A cutting operation evaluator analyzes the current cutting status signals provided by the continuity checker to determine when cutting has been established and subsequently lost. In the simplest mode of operation, at the time that previously-established cutting is indicated as having ceased, the cutting operation evaluator provides a notice to the microprocessor, causing a message to be presented to the operator via the operator interface advising the operator that the cut is complete.

In addition to providing notice to the operator when there is a valid indication from the cutting operation evaluator that cutting is complete, at such time the microprocessor allows the operator, through the operator interface, to activate an archiving routine which generates a unique cutting operation identifier (such as a time stamp) as well as wheel identifier and records this with the data generated the turning of the disk to an addressable report database.

While the wheel processing could be done on an individual basis, it is convenient in practice to turn all wheels or at least multiple wheels on a particular vehicle in sequence before moving on to another vehicle. If such is done, it is preferred that the temporary memory be partitioned so as to have one partition for the vehicle-specific information and another partition for the wheel-specific generated data. This allows a wheel data storage routine to have data for a wheel that has been processed to be stored by an archiving routine that retains the vehicle-specific data when switching from one wheel to another, thus simplifying the entry of the data for additional wheels to be processed.

A vehicle switching routine will allow transfer of the data associated with the vehicle on which the brake disks were serviced to the output database. This is done when the operator indicates that the vehicle work has been competed. It should be noted that the identifiers, such as time stamps, could be provided on the basis of a group of wheels being processed.

While the above system can be employed on any on-vehicle disk brake lathe, it has been found that on-vehicle disk lathes which are hub-mounted have particular utility and, for such lathes, misalignment between axis of rotation of the brake disk and the axis of rotation of the lathe can result in cutting lateral runout into the turned brake disk. To avoid excessive lateral runout being created, these lathes are provided with alignment mechanisms. Dynamic alignment simplifies the operation of the lathe by providing an automatic correction routine. Such alignment systems typically terminate when the misalignment has been reduced below a set level, and in some cases can provide a value for the lateral runout that will result. When a value for the resulting lateral runout is provided, this can be provided to the operator to allow the operator to make a judgement as to whether further adjustment is needed, as taught in U.S. Publication 2009/0107309. When such information is available it can be provided to the temporary memory for subsequent recording in the addressable report database.

While the system as described above treats the on vehicle disk lathe as a separate unit and not part of the system, the lathe could be considered part of the system.

BRIEF DESCRIPTION OF THE FIGURES

FIG. 5 illustrates one stage in manually selecting a vehicle, showing the display when the year of the vehicle has been chosen and a menu of options for vehicle make are displayed for the operator. FIG. 5 also shows a status display that indicates which wheel positions of the vehicle have already been processed for the current vehicle; such may occur when the operator has completed a cutting operation. At this point, the operator can correct any error in the vehicle selection.

FIG. 6 shows the graphic display shown in FIG. 5 at the point where the corrected vehicle identification has been completed, and the operator has selected the appropriate wheel position for the current cutting operation. A wheel icon on a vehicle outline is filled in to show the currently selected position.

DETAILED DESCRIPTION

Figure 1:
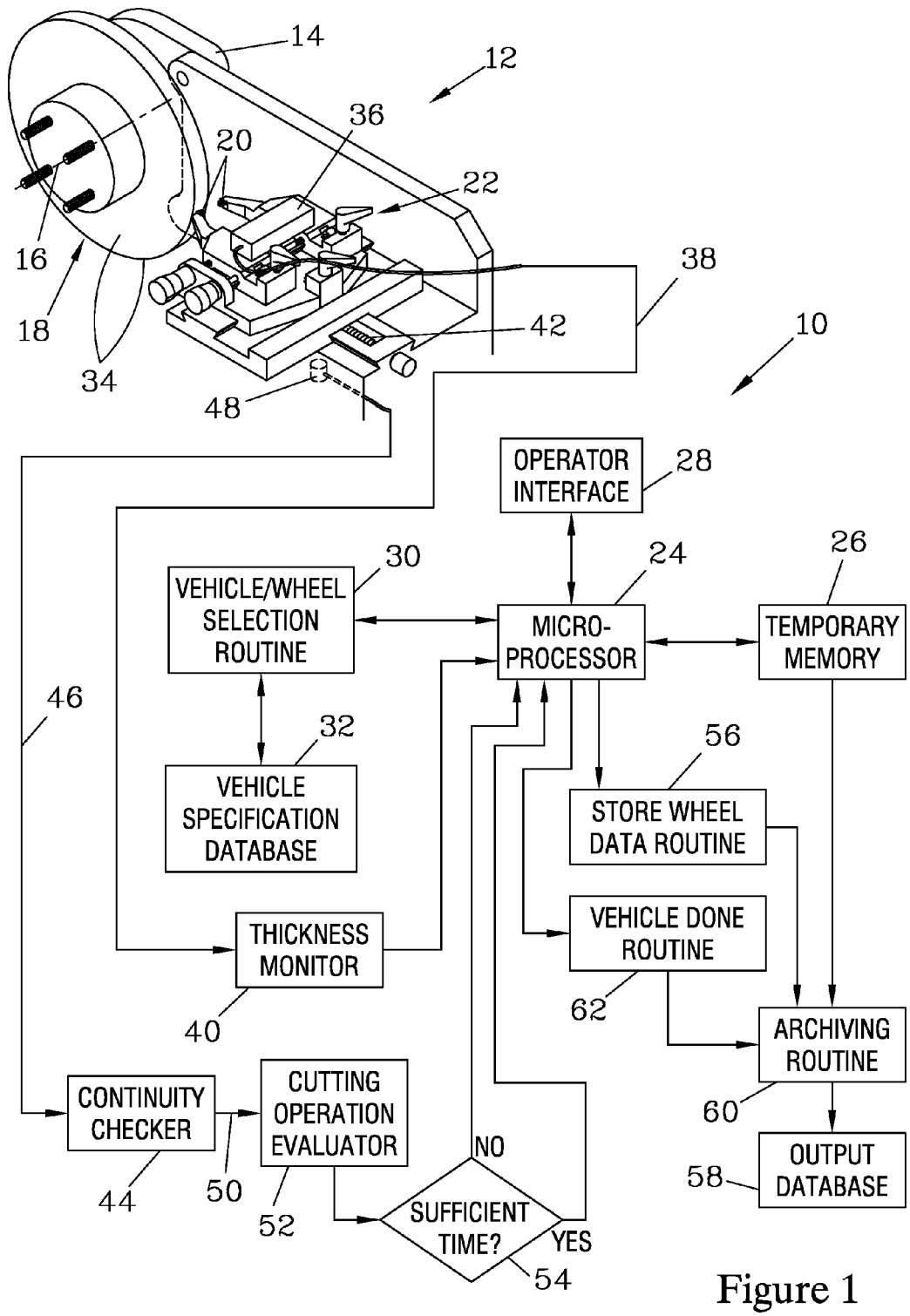
FIG. 1 is a schematic illustration of one embodiment of a reporting lathe system of the present invention. This embodiment is designed for use with a caliper-mounted on-vehicle disk brake lathe to collect data to provide a record of the machining operations performed by the lathe. A microprocessor having an associated memory and operator interface collects data inputted by the operator using a vehicle/wheel selection routine, which enables the operator to select appropriate specifications from a vehicle specification database, and generated by a thickness monitoring routine when the operator sets the depth of cut to resurface a brake disk. A continuity checker provides a signal indicating when tool bits of the lathe are in cutting contact with the brake disk to a cutting operation evaluator that analyzes the signal to determine when a cutting operation has been completed, at which time the operator is allowed to report the collected data in the temporary memory to an output database. The operator can employ a store wheel data routine, which reports to the output database the data collected for the current wheel position, or a vehicle done routine which reports all the data in the temporary memory so that the memory can be cleared for processing a new vehicle.

FIG. 1 is a schematic view of one embodiment of the present invention, a lathe reporting system 10 which operates with a caliper mounted on-vehicle disk brake lathe 12. Since the lathe 12 mounts to a caliper-mounting structure 14 on the vehicle (not shown), rather than to the wheel hub, there is no issue of the alignment of the lathe 12 with respect to a hub axis 16 such as there is when a hub-mounted brake lathe is employed. The caliper mounting structure 14 is affixed with respect to a frame of the vehicle such that the motion of the disk-engaging surfaces of the brake calipers will be parallel to the axis 16 of the disk 18 during service. Thus, the lathe 12 can be designed such that, when the lathe 12 is affixed to this structure 14, the lathe 12 is aligned such that the motion of tool bits 20 of the lathe 12 with respect to the disk 18 is normal to the disk axis 16, and no adjustment of the lathe 12 with respect to the axis 16 is required to prevent introduction of lateral runout when machining the disk 18. The caliper-mounted disk brake lathe 12 includes a cutting head 22 that supports the tool bits 20 and allows their positions to be adjusted by a lathe operator (not shown).

The lathe reporting system 10 monitors and records the progress of the machining process and stores the pertinent information associated with the machining operation; the system 10 has a microprocessor 24 that controls the storage of data in an addressable temporary memory 26. This memory 26 can be provided in any form that is suitable for the particular system 10. While the memory 26 can differ in details and its partitioning, it should have sufficient capacity and organization to store vehicle-related data identifying the vehicle being serviced, an indication of whether a front or rear wheel is being serviced, and sufficient memory to maintain the state of processing and data collected for at least one brake disk.

The microprocessor 24 is provided with an operator interface 28 which has a reporting capacity that can provide the operator the ability to track what has been done with respect to the brakes on the vehicle which is being serviced. The operator interface 28 is provided with a display (not shown) and an operator input interface (not shown), as discussed in greater detail below with regard to more refined embodiments, particularly the embodiment shown in FIG. 4. The operator interface 28 allows the operator to input information needed for the operation of the system 10 into the temporary memory 26. This information may be keyed in by the operator, but preferably a portion of such input is automated. In the system 10, this is done by a vehicle/wheel selection routine 30 which operates on a vehicle specification database 32 and is accessible to the operator via the operator interface 28 through the microprocessor 24. The selected data from the vehicle specification database 32 is stored in an appropriate location in the temporary memory 26 for subsequent use in service.

The temporary memory 26 needs sufficient capacity to allow the operator to input the vehicle year, make, and model (and submodel, in many cases) for the vehicle, as well as the wheel position on the vehicle for the brake disk 18 to be serviced. The temporary memory 26 also needs a location for storing the thickness of the brake disk 18 after machining, and in some instances whether the brake disk 18 meets the specification for thickness for the selected vehicle and wheel position.

Once the temporary memory 26 is loaded with the vehicle and wheel position information, the operator adjusts the positions of the tool bits 20 until they are both in continuous contact with corresponding surfaces 34 of the brake disk 18. The separation between the tool bits 20 is measured by a thickness sensor 36 that generates a thickness signal 38 that is monitored by a thickness monitor 40, the separation being reported to the microprocessor 24 and corresponding to the thickness of the brake disk 18 that will result from machining at the current positions of the tool bits 20. As discussed below for more sophisticated systems, the currently-indicated separation can be compared to the thickness specification for the selected vehicle and wheel position and the result of such comparison provided to the operator to notify the operator when the current separation of the tool bits 20 is insufficient to machine the disk 18 while meeting the specification. When the positions of the tool bits 20 have been set, the operator typically locks the tool bits 20 with respect to the cutting head assembly 22, and activates a feed mechanism 42 for the cutting head assembly 22 so as to traverse the tool bits 20 across the disk surfaces 34.

Once motion is initiated, the tool bits 20 are monitored for contact with the disk surfaces 34 using a continuity checker 44 that processes signals 46 generated by a contact sensor 48, which in turn is responsive to contact between the tool bits 20 and the disk surfaces 34. The continuity checker 44 processes the signals 46 in an incremental time-averaged manner to provides continuity signals 50 that indicate whether or not the tool bits 20 are in substantially continuous contact with the disk surfaces 34. The continuity checker 44 can process the signals 46 in such a manner that the indication of substantially continuous contact is only provided after a time delay such that the continuity signals 50 indicate when such contact has been sufficiently established as to reliably indicate that the tool bits 20 are actively machining the disk surfaces 34 as they are traversed thereacross, and when such contact ceases. When such active, continuous cutting contact is initially indicated, the separation between the tool bits 20 can be stored in the temporary memory 26 as a value for the thickness of the brake disk 18 that will result from the machining process.

A cutting operation evaluator 52 is employed to monitor indicated continuous cutting, tracking when such continuous contact has started and when such has subsequently ceased. If the continuity checker 44 includes a time delay such that the contact signals 50 reliably indicate when cutting of the disk surfaces 34 has commenced, the cutting operation evaluator 52 need only track when the contact signals 50 indicate continuous contact occurring and when such continuous contact subsequently is no longer indicated. When such a time delay is not included in the processing performed by the continuity checker 44, a timing function is performed by the cutting operation evaluator 52 to reliably establish that active cutting of the disk surfaces 34 has started. After active cutting has been reliably established, the subsequent indication that continuous contact has ceased can be interpreted as indicating that an actual cutting operation has been completed, and thus the operator should be allowed to store the collected data as a valid record of the cutting operation. If cutting has not been reliably established, the operator is not allowed to store the collected data as a record.

A further check for reliability of the data collected and stored as a verified record of an actual cutting operation that has been performed can be provided by including a time check 54 to determine whether continuous contact, once established, has been indicated for a predefined verification time, and only allowing the operator to store the collected data as a record if the duration of the indicated continuous contact is at least as long as the verification time period. Such a time period could be conservatively set such that the duration of such continuous contact is somewhat less than the minimum time for the tool bits 20 to traverse the surfaces of the narrowest disk surfaces expected to be encountered. If this time interval is not met, then a signal is set to the microprocessor 24 which causes it to send a message to the operator interface 28 indicating cutting failed. If the time is sufficient, then a signal is provided to the microprocessor 24 to activate a store wheel data routine 56 and send the message that the operator is free to transfer the wheel-specific data to an output database 58.

Once cutting is verified and completion of cut has been determined, there are several options as to how the data can be consolidated and reported. In the system 10, the data is to be archived on a wheel-by-wheel basis, with the store wheel data routine 56 causing the data for the particular wheel to be sent from the temporary memory 26 to the output database 58 by an archiving routine 60 that transfers the wheel-specific data to the output database 58. This data can be transferred along with a unique identifier for the cutting operation, such as a globally unique identifier (GUID) or a time stamp accompanied by an identification of the individual lathe 12 and/or the individual vehicle. At this point, the microprocessor 24 can allow the operator to choose between activating a vehicle done routine 62, if all the wheels of the vehicle have been machined, or having the system repeat the monitoring for thickness, setting a new thickness, and monitoring the contact to evaluate cutting to process a new wheel.

At such time as all wheels on the vehicle requiring machining have been processed, the operator activates the vehicle done routine 62 using the operator interface 28, this routine 62 causing the archiving routine 60 to transfer the remainder of the data in the temporary memory 26 to the output database 58 and to close out the record for the vehicle in question. Alternatively, the archiving routine 60 could cause the vehicle information to be reported along with the information for each individual wheel; however, in either case it is preferred to maintain the vehicle data intact in the temporary memory 26 when switching from one wheel position to another to avoid requiring the vehicle identification to be reentered when multiple wheels are processed on a single vehicle. The archiving routine 60 transfers the data to the output database 58 with a unique identifier if one has not already been provided for each individual cutting operation; again, such identifier could be a time stamp and an identifying number for the lathe 12 and/or the vehicle.

Figure 2:
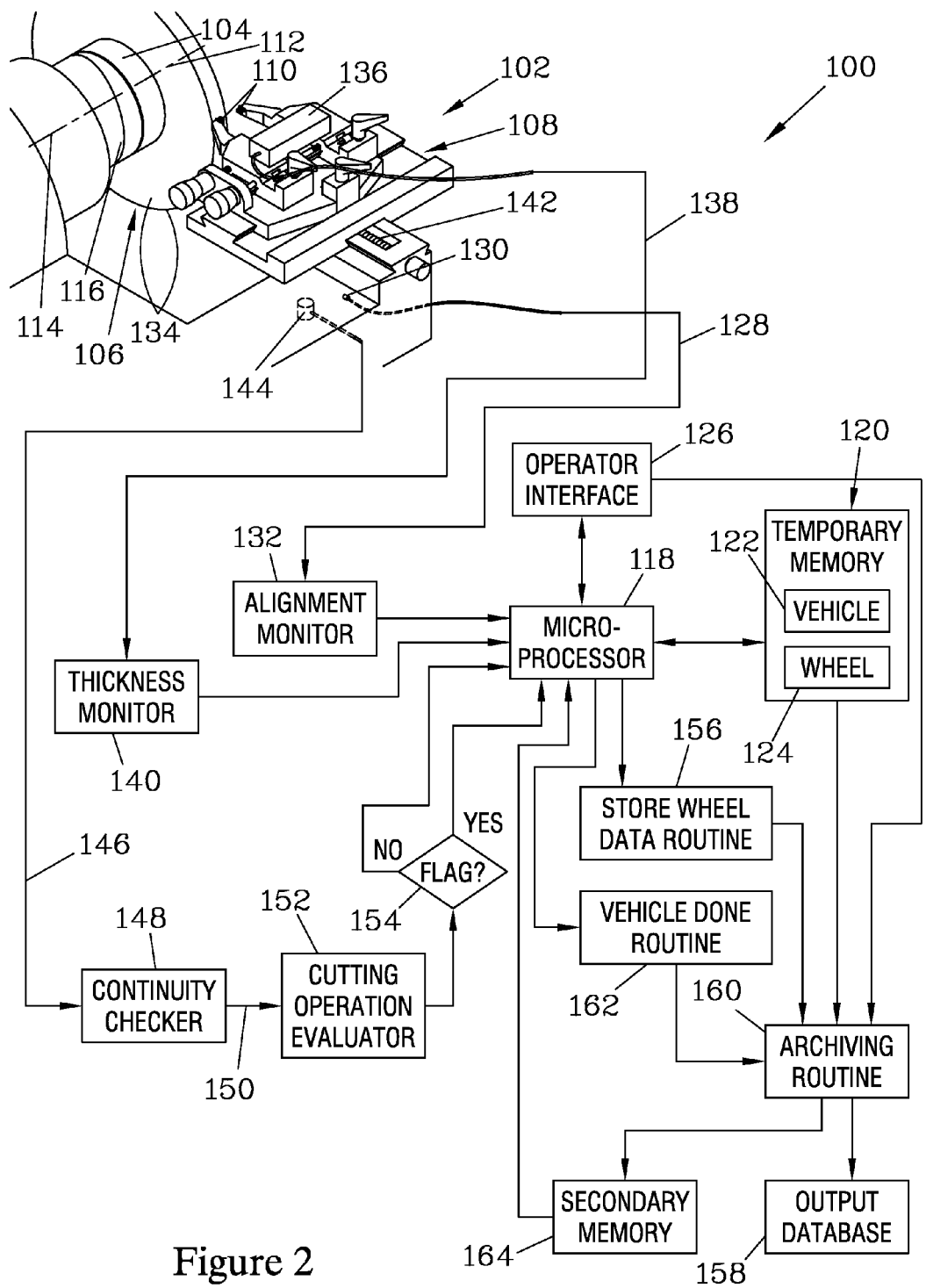
FIG. 2 is a schematic illustration of another embodiment of a reporting lathe system of the present invention, which is designed for use with a hub-mounted brake disk lathe. Accordingly, the system also collects data from an alignment monitor to provide an indication as to whether the degree of misalignment between the lathe and an axis of rotation of the brake disk has been reduced to an acceptably small amount. This embodiment also differs in that the microprocessor does not communicate with a vehicle specification database, and thus the appropriate specifications must be entered by the operator, and in that the temporary memory is provided with separate partitions for storing the wheel-specific data and the vehicle-specific data.

FIG. 2 is a schematic view of another rudimentary embodiment of a reporting lathe system 100 of the present invention. This system differs from the system 10 discussed above, since it is designed to operate with a hub-mounted on-vehicle disk brake lathe 102. Mounting the lathe 102 directly to a wheel hub 104 reduces the flexing of the lathe 102 with respect to a brake disk 106 and offers a potential gain in maintaining a true surface with respect to motion of a cutting head 108 that supports tool bits 110, since the lathe 102 is now rigidly attached with respect to the disk 106. However, the skew of the cut in this case is affected by the axial alignment between a hub axis 112 and a lathe axis 114, thus it is critical that the two axes (112, 114) be aligned to avoid introducing excessive lateral runout when the brake disk 106 is resurfaced by the lathe 102. Thus, such lathes are provided with an alignment mechanism 116 that allows the misalignment between axes (112, 114) to be reduced to an acceptably small amount, as taught in U.S. Pat. No. 6,101,911 and related patents. The cutting head assembly 108 of the brake lathe 102 allows the positions of the tool bits 110 to be adjusted by a lathe operator (not shown) and subsequently moves to traverse the tool bits 110 across the brake disk 106.

The lathe system 100 has a microprocessor 118 which serves to monitor and record the progress of the machining of the brake disk 106, and stores the pertinent information associated with the machining operation in a temporary memory 120 that is addressable by the microprocessor 118. This memory 120 can be provided in any form that is suitable for the particular system 100, but in any case needs to have sufficient capacity and organization to store vehicle-related data identifying the vehicle being serviced, an indication of whether a front or rear wheel is being serviced, and sufficient memory to maintain the state of processing and data collected for at least one brake disk. In the system 100 illustrated, the temporary memory 120 has a vehicle data partition 122, for storing the information identifying the vehicle year make, model, and submodel, and a wheel data partition 124 for storing data specific to the current cutting operation, including the thickness for the currently-selected wheel position and identification of the position selected. The wheel data partition 124 may also include a location for storing an indication of the lateral runout after alignment, or an indication that the misalignment has been reduced to an acceptably small amount.

The microprocessor 118 is provided with an operator interface 126 which may have a display (not shown) and which, at a minimum, has a reporting capacity that allows the operator to track what has been done with respect to the brakes on the vehicle which is being serviced. The operator interface 126 also has an input interface which allows the operator to input information needed for the operation of the system into the temporary memory 120. In the system 100, the information is keyed in by the operator, since the system 100 does not provide access to a searchable database and a routine for searching such a database and extracting information from the same.

As noted above, the temporary memory 120 needs sufficient capacity to allow the operator to input the vehicle year, make, and model (and submodel, in many cases) for the vehicle, as well as the wheel position on the vehicle for the brake disk 106 to be serviced and data generated during the machining process, including the thickness of the brake disk 106 after machining, and in some instances whether the brake disk 106 meets the specification for thickness for the selected vehicle and wheel position and, optionally, an indication of the alignment.

Once the temporary memory 120 is loaded with the vehicle and wheel position information, the alignment mechanism 116 of the lathe 102 is adjusted to reduce the misalignment of the axes (112, 114), either manually or automatically. When the alignment mechanism 116 is an automatically-adjusted mechanism, it receives alignment signals 128 from an alignment sensor 130, which are communicated to an alignment monitor 132 that provides notice to the microprocessor 118 of the state of alignment, which can in turn be displayed to the operator via the operator interface 126; the alignment monitor 132 can be an integral part of the alignment mechanism 116; one particularly well-suited alignment monitor that interacts with an automated alignment mechanism is taught in U.S. Publication 2009/0107309. When not provided as part of the alignment mechanism 116, the alignment sensor 130 could be provided as a separate element to provide an indication of the alignment when such is desired in the data provided by the reporting system 100. The state of the alignment as indicated by the alignment monitor 132 is provided to the temporary memory 120 for storage in the wheel data partition 124. Depending on the alignment monitor 132 employed, the misalignment can be expressed as a value of lateral runout which will result from machining the brake disk 106 under the current state of misalignment, or simply as a notice of whether or not the misalignment has been reduced to less than a specified amount.

After the alignment procedure, the operator adjusts the positions of the tool bits 110 of the lathe 102 until each is in continuous contact with a corresponding surface 134 of the brake disk 106. A thickness sensor 136 responds to the adjustment of the position of the tool bits 110 and generates signals 138 that are monitored by a thickness monitor 140 that determines the separation between the tool bits 110 and reports the indicated separation to the microprocessor 118 for storage in the wheel data partition 124 of the temporary memory 120. When the tool bits 110 have been fixed in the desired positions to cut the disk surfaces 134, this separation corresponds to the thickness of the brake disk 106 that will result from machining. Preferably, the microprocessor 118 compares the indicated thickness to the thickness specification for the selected vehicle and wheel position to provide the operator notice of whether the indicated thickness is sufficient to meet the specification; such notice can inform the operator when the thickness of the disk 106 is insufficient to meet the specification, in which case the disk 106 should be replaced rather than resurfaced.

When the positions of the tool bits 110 have been set, the operator activates a feed mechanism 142 of the lathe 102, causing the tool bits 110 to traverse the disk surfaces 134 to resurface the disk 106. Once motion is initiated, a contact sensor 144 provides a contact signal 146 responsive to contact between the tool bits 110 and the disk surfaces 134. A contact continuity checker 148 is provided that, at a minimum, integrates the signal 146 over short intervals of time to establish continuity of the cutting operation. The continuity checker generates a continuity signal 150 indicative of the state of contact.

A cutting operation evaluator 152 is employed to track the continuity signal 150 to determine whether continuous cutting has been sufficiently established that it is appropriate, after such cutting is indicated as having subsequently ceased, to allow the operator to store the indicated thickness (and alignment indication, if such is to be reported) as a valid record of an actual cutting operation. Typically, there should be proof of sustained cutting for a specified verification time period, as discussed earlier, before there is reliance on the cutting operation evaluator 152 for determining that a cut has been completed. This can be accomplished by a time check routine 154 that monitors the length of the cutting indication provided by signal 150 and, if not maintained for a sufficient time with respect to the specified time period as discussed earlier, a signal is sent to the microprocessor 118 that a competed cut has not been made and thus the collected data cannot be stored as a valid record. A notice of such is also be sent to the operator interface 126 so the operator can take appropriate actions.

As discussed in greater detail below, in some situations the criteria for determining when the data collected during the cutting procedure can be reported as a record of the cutting operation depends on whether or not the indicated thickness of the brake disk 106 meets the selected specification. For example, if the requirement that continuous cutting indication be sustained for a specified period is ignored when the thickness is not sufficient, this allows an operator to make a short verification cut on the brake disk 106 to provide a record that the thickness of the disk is insufficient to meet the specifications, before replacing the disk 106 with a new disk. This allows the operator to provide a record that the disk 106 cannot be machined to meet specifications without requiring the entire disk 106 to be fully resurfaced, thereby preserving a portion of the disk surfaces 134 intact for further study.

When the cut has been determined by the cutting operation evaluator 152 to be complete, the microprocessor 118 provides notice to the operator and allows the operator to store the data generated during the cutting operation as a verified record of the cutting operation. There are several options as to how the data can be consolidated. In the illustrated system 100, the data is to be archived on a wheel-by-wheel basis and is collected in the wheel data partition 124, and thereafter reported when a store wheel data routine 156 is activated. The store wheel data routine 156 sends the data for the particular wheel to an output database 158 using an archiving routine 160 that transfers the data stored in the wheel data partition 124 to the output database 158, typically with a unique identifier such as a globally unique identifier (GUID) or a time stamp. The process can then be repeated to resurface another brake disk, clearing the data in the wheel data partition 124 while leaving the data in the vehicle data partition 122 intact. This is repeated until such time as all wheels have been processed. At that time, the operator can activate a vehicle done routine 162 that transfers the data contained in the vehicle data partition 122 to the output database 158 and closes out the record for the vehicle in question. In the event that a unique identifier has not been provided for each of the individual cutting operations, one is provided as a part of the data sent to the output database 158 by the archiving routine 160 when the vehicle done routine 162 is activated.

It should be noted that, in some circumstances, the operator may choose to make more than one cut on the disk 106, such as when the surface condition is so rough as to merit making more than one traverse of the tool bits 110 to resurface the disk 106. To allow such subsequent machining, the system 100 can be configured such that the alignment indication stored in the wheel data partition 124 is not cleared until such time as a sensor (not shown) indicates that a motor of the lathe 102 has been shut off, since the motor must be shut off before the lathe 102 can be mounted to a new wheel hub. Retaining the alignment indication in the memory 120 allows the operator to make a subsequent cut, recording a new thickness value, without having to realign the lathe 102.

In the system 100 illustrated, the archiving routine 160 also reports the data for each wheel after completion of the cutting operation to a secondary memory 164, which stores all the data for the wheels of the vehicle that have been processed. This secondary memory 164 can be accessed by the microprocessor 118 to provide a display on the operator interface 126 to provide the operator notice of which wheels of the vehicle have already been processed, such as illustrated in the graphic display shown in FIGS. 5 and 6 discussed below. While illustrated as an independent element, the secondary memory 164 could be provided as a portion of the temporary memory 120. In any case, the content of the temporary memory 164 should be cleared when the vehicle done routine 162 is activated.

Figure 3:
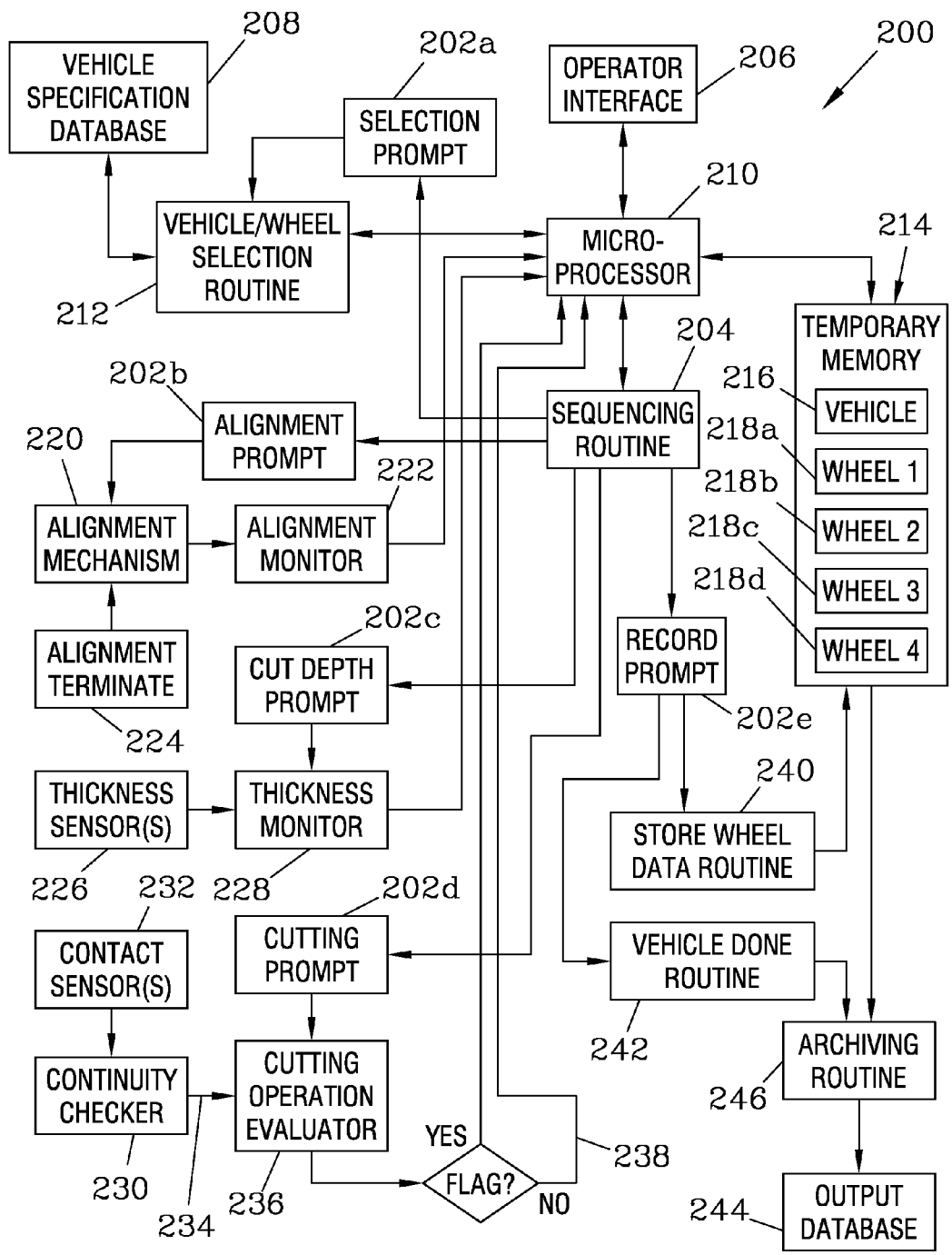
FIG. 3 is a schematic illustration of another embodiment of a reporting lathe system of the present invention suitable for use with a hub-mounted lathe. In this system, a sequencing routine tracks the status of the disk-turning procedure and provide the operator with appropriate prompts as to when it is appropriate to continue. This system also employs a temporary memory having four wheel data partitions, one for each wheel position, for storing the data collected for the wheel currently being processed. A partition for vehicle-specific data is also included in the temporary memory. A cutting operation evaluator sets a flag indicating when a cutting operation has been completed, at which time the operator is prompted and allowed to have the data collected for the current operation stored in the currently-active wheel register as a validated record of the cutting operation for subsequent reporting to an output database.

FIG. 3 is a schematic view of part of a reporting system 200 that has many of the features of the system 100 shown in FIG. 2, and which serves to track and record the operation of a hub-mounted brake lathe (not shown) that is equipped with sensors for monitoring its actions. The system 200 is designed to include a report of the alignment condition of the lathe with the reported data generated as a result of the machining. FIG. 3 illustrates the system 200 providing prompts 202 for the benefit of the operator, these prompts being generated by a sequencing routine 204 of the system 200. These prompts 202 are generated by the sequencing routine 204 as it responds to flags that are set as steps in the resurfacing of a disk are completed. These prompts 202 assist the operator when familiarizing the user with the system 200 and provide notice to the operator as to when corrective action should be taken before proceeding. These prompts 202 are provided before the subsequent step in the resurfacing procedure is to be taken and can be displayed on a screen which is part of an operator interface 206.

The system 200 employs an external vehicle specification database 208 that is accessed by a microprocessor 210 via a vehicle/wheel selection routine 212 that allows the operator, through the operator interface 206, to select an appropriate vehicle from the vehicle specification database 208 without requiring the operator to key in such data. The operator interface 206 also allows the wheel position for the brake disk to be machined to be loaded into the system 200. The data in the specification database 208 usually include a minimum thickness value and, frequently, also include a maximum lateral runout value. Such a selection process, employing optional devices that allow much of the data to be entered automatically, is discussed below in the description of FIG. 4.

When the system 200 is initially started, the sequencing routine 204 provides the operator with a prompt 202a to make a selection of the vehicle and wheel position (front or rear) for the brake disk to be machined. The operator, using the vehicle/wheel selection routine 212, makes a selection of the vehicle to identify the brake specification data in the vehicle specification database 208 that correspond to the selected vehicle, and makes a selection of the wheel position for the disk to be turned, which determines whether the specifications for a front or rear wheel should be used. This information is provided to the microprocessor 210 for storage in a temporary memory 214. In the system 200 illustrated, the temporary memory 214 is provided with a vehicle data partition 216, and four wheel data partitions (218a, 218b, 218c, 218d). The information on the selected vehicle is stored in the vehicle data partition 216, while information identifying the wheel position selection made by the operator is stored in the first wheel data partition 218a. The specification data obtained from the vehicle specification database 208 can be stored in the vehicle data partition 216. When a selection has been made, a flag indicating that a vehicle and wheel position have been selected is set by the vehicle/wheel selection routine 212.

In response to such flag, the sequencing routine 204 provides a prompt 202b which provides notice to the operator as to what disk is being processed and for the operator to align a rotation axis of the lathe with the axis of rotation of the brake disk by adjusting an alignment mechanism 220. The alignment mechanism 220 in this embodiment adjusts the alignment automatically, as taught in U.S. Pat. Nos. 6,101,911 and related patents, and in U.S. Publication 2009/0107309. In the system 200, which is designed to report alignment as well as thickness of the resulting brake disk after machining, an alignment monitor 222 provides an indication of the state of misalignment between the lathe and hub axes, at least at the time that the adjustment is stopped by an alignment termination 224; the alignment monitor 222 can be an integral part of the alignment mechanism 220. As discussed below with regard to FIGS. 7 and 8, termination of the alignment adjustment can be automatically accomplished by the alignment system 220 or can be in response to an override by the operator. In either case, an indication of the current state of alignment can be provided to the microprocessor 210 for storage in the current wheel data partition 218a of the memory 214; such could indicate the lateral runout that would result from machining the brake disk under the state of misalignment when adjustment has ceased or could simply indicate that the misalignment is sufficiently small as to make it appropriate to proceed with the machining process.

When a value for resulting lateral runout is provided by the alignment monitor 222, this indicated lateral runout can be compared to the specification for maximum lateral runout for the selected vehicle and wheel position to determine whether the currently indicated misalignment exceeds the specification; a flag indicating whether or not the specification is met can be set and a notice of such condition provided to the operator via the interface 206. If the alignment does not meet the specification, the system 200 may display the prompt 202b again to indicate that the alignment procedure should be repeated, or may otherwise prompt the operator to take corrective action before continuing with the machining procedure responsive to the flag being set.

If the indicated misalignment meets the selected specification, a flag that alignment is satisfactory can be set, and the sequencing routine 204 can provide a prompt 202c to inform the operator that it is now appropriate to adjust tool bits of the lathe to set a depth of cut for the machining operation. One or more thickness sensors 226 respond to the adjustment of the tool bits of the lathe so as to provide an indication of the separation therebetween to a thickness monitor 228, which reports this thickness to the microprocessor 210. Regardless of the currently-indicated state of alignment, the separation indicated by the thickness monitor 228 is typically displayed on the operator interface 206 when any change is detected to allow the system 200 to track any change in the positions of the tool bits.

As discussed in greater detail below when describing FIG. 9, the microprocessor 210 can compare the indicated separation, which corresponds to the thickness that will result from machining the brake disk, to the selected minimum thickness specification, and set an appropriate flag indicating whether or not the specification is met. This allows the system 200 to provide a notice to the operator when the tool bits have been adjusted such that the machining operation will not result in the disk meeting specifications, in which case the operator should set the tool bits to a lesser depth, if possible, or should replace the brake disk to prevent an unnecessary machining operation. In the latter case, the operator may be prompted to make a small verification cut on the disk to provide a record that the disk is too thin to meet specifications, thereby verifying the need for replacement before replacing the disk. Discussion of this feature and how to effectively implement the same is further discussed in the description for FIGS. 14 and 15.

As long as the thickness is sufficient to meet the specified minimum, a prompt 202*d* can be provided by the sequencing routine 204 to the operator to indicate that the thickness is sufficient for the operator to begin the actual machining of the brake disk by activating a feed mechanism of the lathe to traverse the tool bits across the disk surfaces. When the operator activates the feed mechanism (not shown) to cut the disk surfaces, a continuity checker 230 responds to signals generated by one or more contact sensors 232 that in turn are responsive to the interaction of the tool bits with the disk surfaces, the continuity checker 230 making an evaluation as to whether the tool bits are in essentially continuous contact with the disk surfaces over discreet time intervals. The continuity checker 230 in turn provides continuity signals 234 which indicate continuous contact or lack thereof. These continuity signals 234 are the analyzed by a cutting operation evaluator 236 that monitors the indication for sustained continuous contact to make a determination as to whether the continuous cutting has been sustained long enough to reliably establish that active cutting has commenced, such that the collected data in the wheel partition 218 corresponds to a valid cutting operation being performed. If continuous cutting contact is not sustained long enough to reliably establish active cutting, then a failure signal 238 is provided to the microprocessor 210 which, responsive to the signal, provides a notice to the operator interface that cut cannot be validated.

If contact has been sustained for a time sufficient to establish active cutting, and the cutting operation evaluator 236 indicates cut is complete, the sequencing routine 204 provides a record prompt 202*e* to the operator to have the data for the cutting operation stored in the currently-selected wheel data partition 218 validated as a record of an actual cutting operation. In the system 200 illustrated, the operator is prompted to select either a store wheel data routine 240 or a vehicle done routine 242, depending on whether the operator has further wheels to process on the vehicle.

Figure 14:
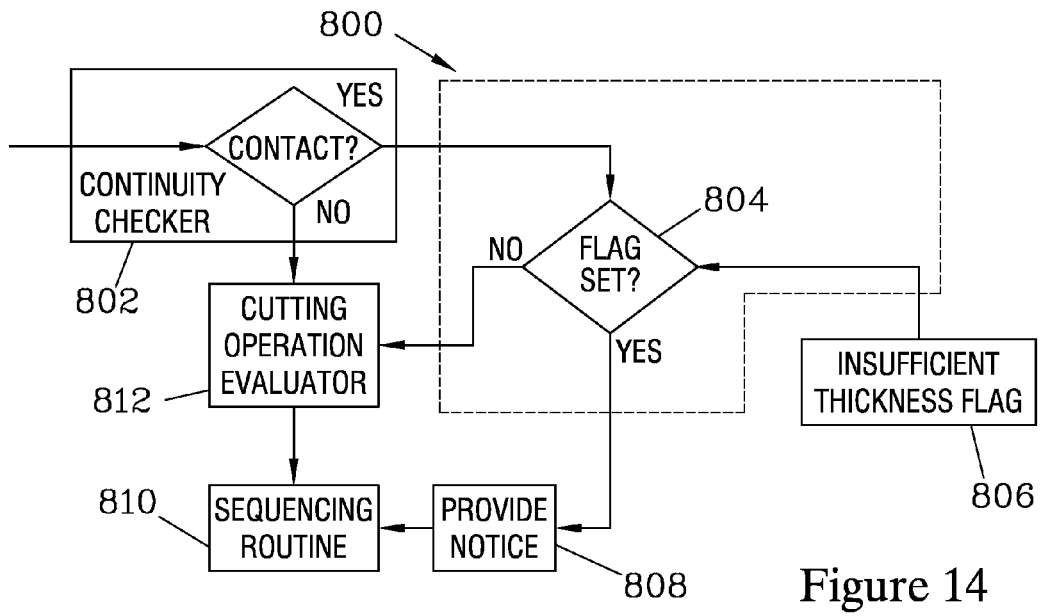
FIG. 14 is a schematic illustration of a cutting operation evaluator bypass that can compliment the cutting operation evaluator to allow the operator to have the data for the current cut recorded as soon as cutting is indicated in the event that the separation of the tool bits is insufficient to meet the specification. This bypass allows the operator to make a small verification cut on the disk, to provide a record of it being too thin to be machined to meet the specification, without requiring the operator to machine the entire disk surfaces. This encourages the operator to make only a small cut, leaving the remainder of the disk surfaces intact for study by the manufacturer. The bypass shown in FIG. 14 is designed to operate with a continuity checker that only provides an indication of continuous contact when such has been reliably sustained to establish the existence of active cutting. In this case, when the thickness indicated by the separation of the tool bits is not great enough to meet the specification, the bypass provides a notice to allow recording the data as soon as this contact signal is received from the continuity checker.
Figure 15:
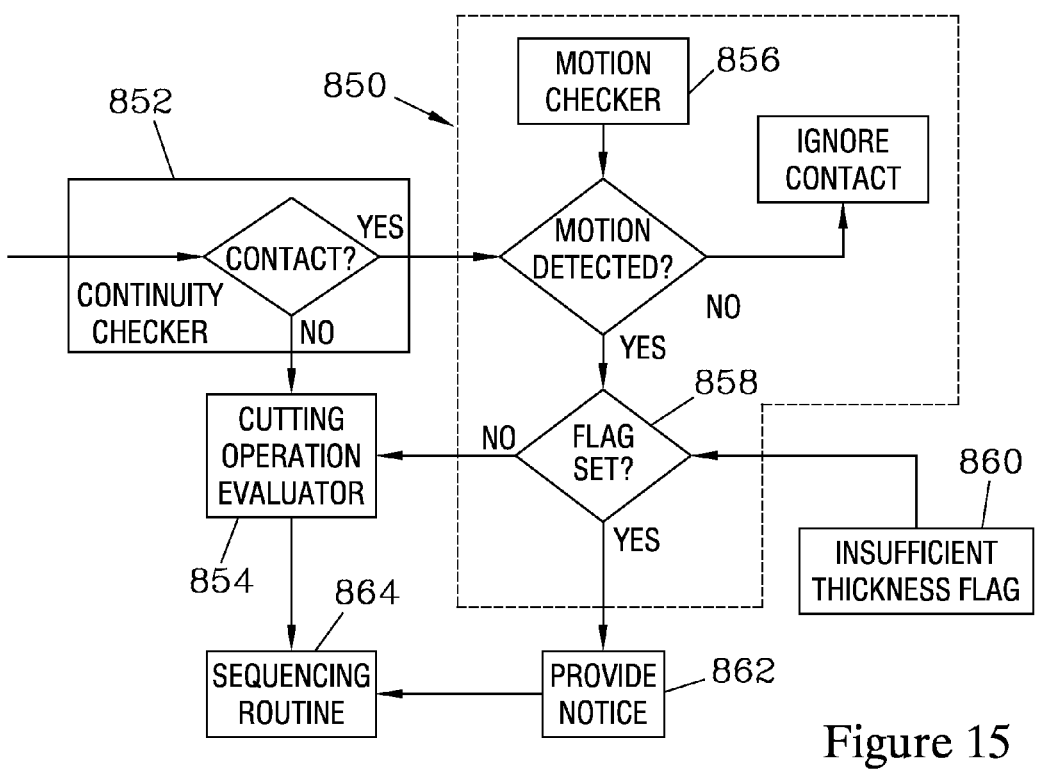
FIG. 15 is a schematic of an alternative cutting operation evaluator bypass, which does not depend on the details of a continuity checker. In this embodiment, the bypass responds to motion of the tool bits in combination with an indication of contact to allow the operator to report the data for the failed disk in the event that the indicated thickness of the disk is not sufficient to meet the specifications.

Details of such cutting operation evaluators for other than the current embodiment are discussed below with regard to FIGS. 10-13. As discussed in greater detail in the description of FIG. 13, the cutting operation evaluator may require that continuous contact be maintained for a minimum time period to provide further verification of the record before allowing the operator to report the data for the cutting operation. Regardless of the cutting operation evaluator employed, as discussed for the embodiments, a complimentary failed disk verification routine such as shown in FIGS. 14 and 15 can be employed to allow recording the data regardless of the cutting operation evaluator in the event that the currently indicated thickness is not sufficient to meet the specified minimum, thereby allowing the operator to make a small verification cut on the disk to provide a record that it is in need of replacement without requiring the operator to resurface the brake disk.

When the store wheel data routine 240 is activated, it causes the information on the most recent cutting operation (including any indication of the alignment condition and the indicated thickness) that has been collected in the current wheel data partition 218*a* to be validated as a record, and a flag can be set indicating that a report for that wheel position has been made. A unique identifier for the cutting operation, such as a time stamp, should also be included in the record. The validated record can be transferred to an output database 244 at this time, or can be stored and subsequently transferred when all the wheels of the vehicle have been processed. In either case, the store wheel data routine 240 advances the index of the currently-active wheel data partition to the next available wheel data partition (in this case, the second wheel data partition 218*b*) for storing information on a subsequent brake disk to be processed. Preferably, a prompt is provided to the user to verify that the correct wheel position has been selected. When the system 200 detects that the lathe motor has stopped (as required to mount the lathe to a new wheel hub) and has again started, the sequencing routine 204 can reinitialize and prompt the operator to select the new wheel position for the next cutting operation.

After the desired number of wheels of the vehicle have been processed, the operator can activate the vehicle done routine 242 upon receiving the record prompt 202*e* after a cutting operation has been completed. When the vehicle done routine 242 is activated, it causes an archiving routine 246 to transfer at least all previously unreported data stored in the temporary memory 214 to the output database 244, along with a unique identifier if such identifiers have not been provided for the records stored in the individual wheel data partitions (218*a*-218*d*). The data collected in the temporary memory 214 can then be cleared; however, such information should be cleared only after a prompt to do so is provided to the operator, allowing the operator to replace the vehicle information stored in the vehicle data partition 216 while retaining the data collected in the wheel data partitions (218*a*-218*d*) in the event that the operator has previously made an incorrect vehicle selection and now wishes to associate the collected data with a corrected vehicle, and/or allowing the operator to make a second cut on the same disk while retaining the stored alignment indication for that wheel position.

Figure 4:
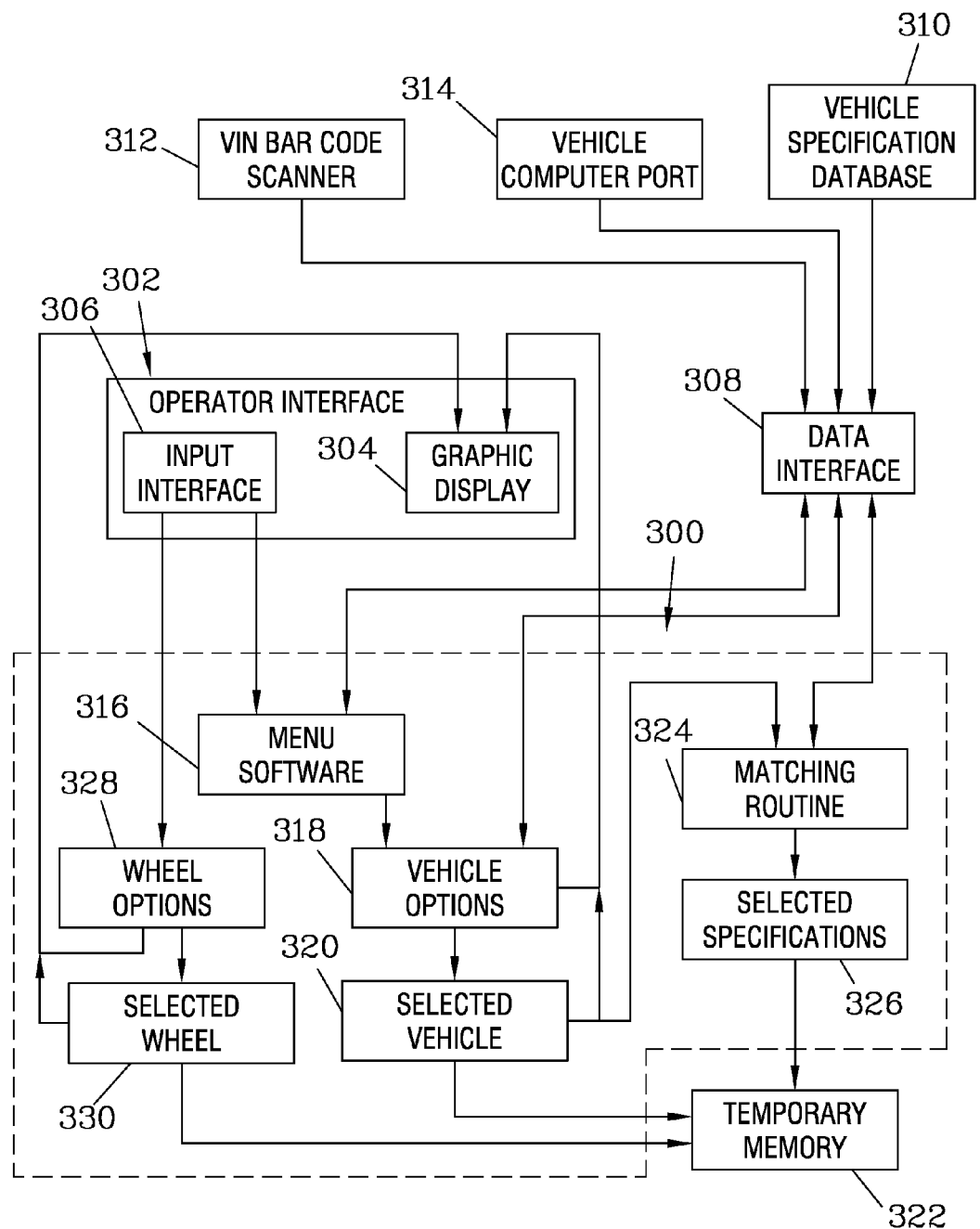
FIG. 4 is a schematic view illustrating the operation of a vehicle/wheel selection routine that can be used in systems such as those shown in FIGS. 1 and 3 to allow an operator to select appropriate specifications from a vehicle specification database that communicates with a microprocessor (not shown) that controls the vehicle/wheel selection routine. The selection can be partly automated when a VIN scanner and/or a vehicle computer port is accessible via a data interface. The routine employs menu software to provide menu options on a display of an operator interface, and an operator input interface allows the operator to make selections from the menu options to select the vehicle year, make, model, and sub-model, as well as to select the appropriate wheel position for a brake disk currently being processed. When a vehicle has been selected, a matching routine loads the appropriate specifications from the vehicle specification database, which can also be accessed through the data interface, for storage in a temporary memory. The selected wheel position is also provided for storage in the temporary memory, and will determine whether the specifications for a front or rear wheel are subsequently used by the reporting system.

FIG. 4 is a schematic view that provides a more detailed presentation of one embodiment of a vehicle/wheel data selection routine 300 and related system elements of a reporting system (not shown in its entirety), which could be employed to provide the vehicle/wheel data selection routine 212 and the associated operator interface 206 of the system 200 broadly discussed above with regard to FIG. 3. In this embodiment, an operator interface 302 has a graphic display 304 for presentation of menu options and data to the operator and an input interface 306 allowing the operator to input selections of the options displayed. The input interface 306 can be conveniently provided by a mouse or other device for moving a cursor over options displayed on the graphic display 304, by making the graphic display 304 touch sensitive, or by similar interactive devices known in the art.

The system includes a microprocessor (not shown) which interacts with the routine 300, the microprocessor communicating with the operator interface 302 as well as with an auxiliary data interface 308 that provides for communication between the microprocessor and a vehicle specification database 310, which can be indexed by vehicle identification number (VIN), an optional bar code scanner 312, and an optional vehicle computer port 314. Either the bar code scanner 312 or the vehicle computer port 314 can be used to identify at least some of the identifying information for the vehicle, typically providing the year, make, and model, but typically not the submodel.

The vehicle/wheel data selection routine 300 illustrated also provides a menu-driven scheme for selecting the appropriate vehicle identification; it should be appreciated that alternative schemes for inputting the vehicle identification to the system could be employed. The routine 300 has menu software 316 that interacts with the vehicle specification database 310 to allow the operator to make selections in an interactive manner, by providing the operator with a menu of selections for the available options based on previous selections. The menu software 316 provides a series of vehicle options 318 on the display 304, typically in the form of menus, in a manner well known in the art for allowing selection of a particular vehicle from a database. In an illustrative example where all the selections are made by the operator, the menu software 316 provides an initial selection of the vehicle options 318 for a first field of the records in the vehicle specification database 310, such as the vehicle year. The vehicle options 318 are then presented to the operator on the graphic display 304 in the form of a menu of possible years. The operator uses the input interface 306 to select the appropriate year from the displayed menu, and the menu software 316 uses the database 310 to formulate the next series of vehicle options 318, which in this example consists of the possible vehicle makes for the selected year. These vehicle options 318 are then displayed as a new menu on the graphic display 304 for the operator to make a selection. This iterative selection process is repeated to select the model and, if appropriate, the submodel of the vehicle to provide a selected vehicle 320. As noted above, when the VIN bar code scanner 312 or the vehicle computer port 314 is employed, such devices typically provide the selections for the year, make, and model of the vehicle, in which case the vehicle options 318 presented to the operator will only be options for the possible submodels for that particular year, make, and model.

When all fields for identification of the selected vehicle 320 have been entered, such information is appropriately coded and this coded value is stored into an appropriate location in a temporary memory 322. A matching routine 324 locates the brake specification data in the vehicle database 310 that correspond to the coded value for selected vehicle 320; these selected specifications 326 are also stored in the temporary memory 322 in an appropriate location, for use by the system to provide notices to the operator during the machining process, as discussed in greater detail below with regard to FIGS. 8 and 9. In an alternate scheme, not illustrated, the specification information could be retrieved from the vehicle database 310 as needed, in which case the selection of the appropriate specifications may also require selection of a particular wheel position. In any case, the identification of the selected vehicle 320 should also be displayed on the graphic display 304 so that the operator can check the identity of the vehicle selection to reduce the likelihood of entry error.

Since the brake specifications typically differ for front and rear brakes on a particular vehicle, the routine 300 also allows the operator to select an appropriate position on the vehicle for the brake disk currently being processed. Again, such selection can be conveniently made by presenting wheel options 328 on the display 304 for the operator, who may then select the appropriate option to provide a selected wheel position 330 for storage in an appropriate location in the temporary memory 322. This selected wheel position 330 is used by the system to select the appropriate subset of the selected specifications 326, depending on whether the selected position is for a front wheel or a rear wheel. Again, the selection made is presented to the operator via the display 304 to allow the operator to confirm that the selected wheel position 330 is appropriate.

Figure 5:
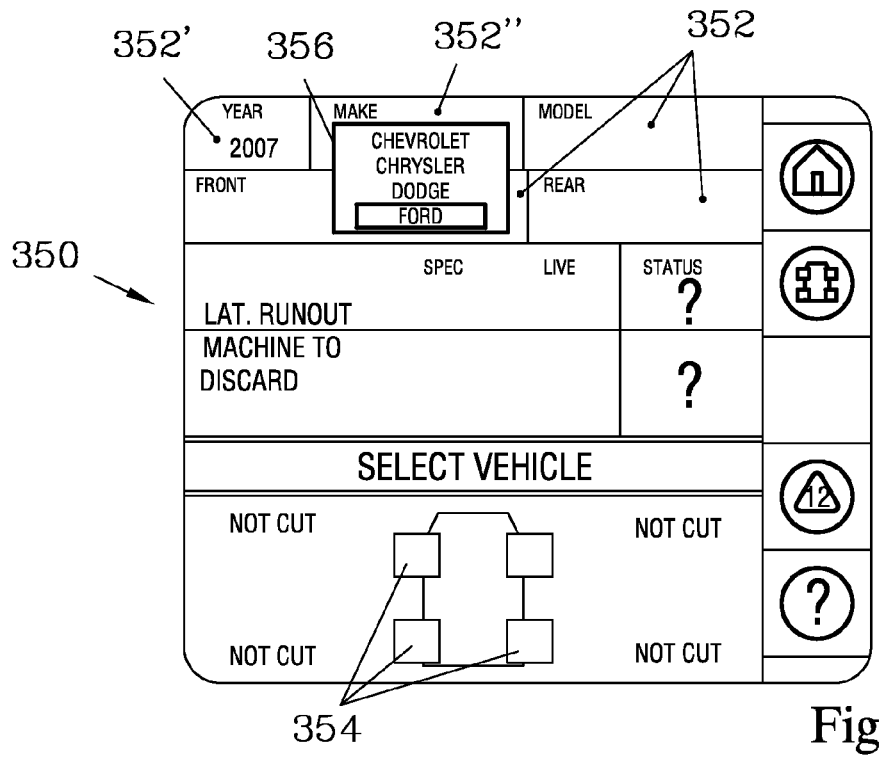
FIGS. 5 and 6 illustrate examples of graphic displays that could be employed by a vehicle/wheel selection routine such as shown in FIG. 4.
Figure 6:
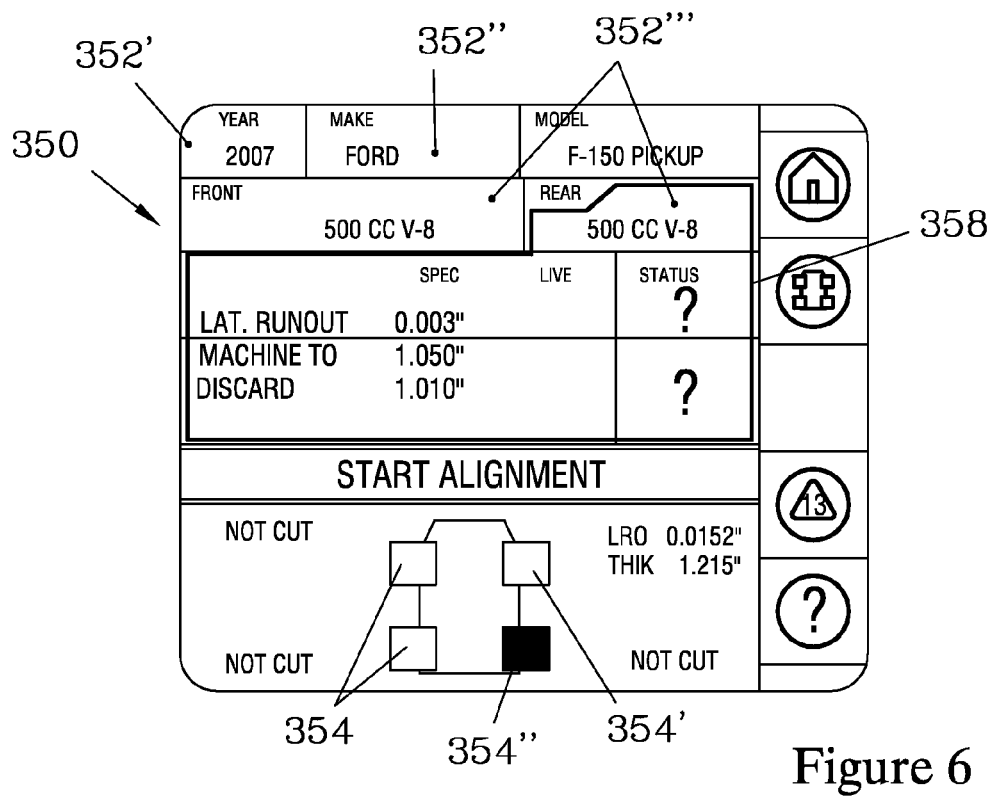

FIGS. 5 and 6 illustrate an example of a touch-sensitive interactive display 350 that could be employed to provide the operator interface 302 discussed above. The interactive display 350 serves both to as a graphic display to present options to the operator and as an input interface to allow the operator, by touching a desired option, to make selections. The interactive display 350 illustrated has a number of vehicle identification fields 352 and four wheel position icons 354.

When selecting a vehicle, the operator can make selections from a menu presented within the particular vehicle identification field 352. FIG. 5 shows an example of the display that might be presented when the operator has previously made a selection for the year of the vehicle, as indicated in a first vehicle identification field 352'. In response, a selection of options for vehicle make appropriate for the selected year are displayed as a vehicle make menu 356 in a second vehicle identification field 352"; if the number of options is greater than can be conveniently displayed, the menu 356 can be designed to allow the operator to scroll through the options. The operator can select the appropriate make of vehicle by touching the desired option in the menu 356. A vehicle/wheel data selection routine can then use this selection to identify possible options for the model of vehicle for presentation on a subsequent menu, allowing the operator to also select the model and submodel of vehicle. As each selection is made, the selection is indicated in the appropriate fields 352 for review by the operator, until all fields are filled as shown in FIG. 6.

The interactive display 350 also allows the operator to select the appropriate wheel position by touching one of the wheel icons 354. As illustrated, the interactive display 350 provides an indication of which wheel positions have already been processed by displaying the lateral runout and thickness values for the machined disk for those wheels that have already been processed, as shown for the wheel icon 354' in FIG. 6. The currently-selected wheel position can be indicated by changing the character of the wheel icon, such as is shown for the wheel icon 354" which is shown filled rather than outlined. The identification of whether the selected wheel is a front or rear wheel, which determines which specifications are used, is also indicated in the example by a highlighted outline 358, which outlines a region of the display 350 that includes duplicate fields 352'" for indicating the vehicle submodel, one each for the front and rear.

Figure 7:
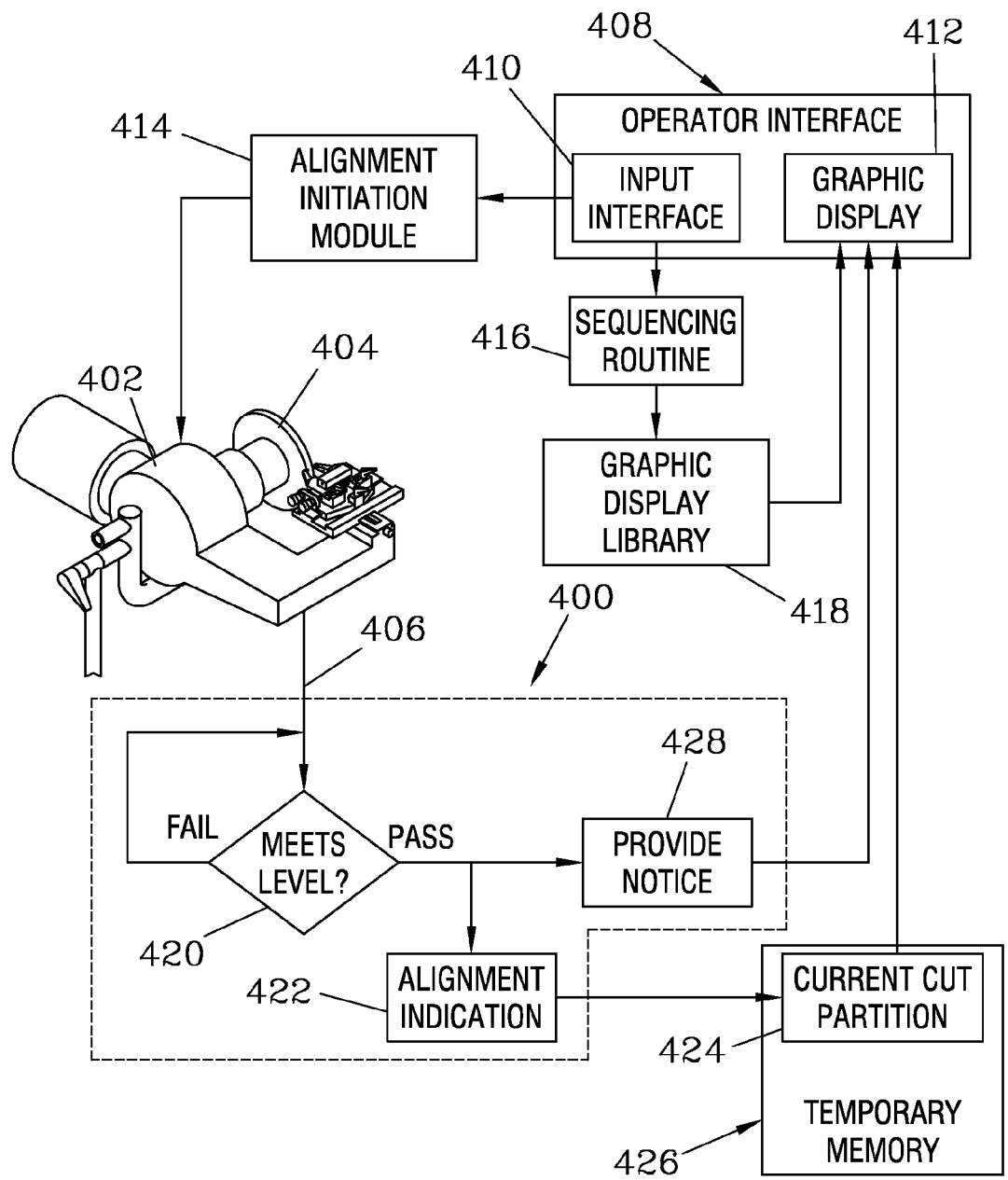
FIG. 7 is a schematic illustration of one example of an alignment monitor for the reporting system of the present invention; this alignment monitor is designed for use with a hub-mounted brake lathe having an alignment adjustment mechanism that provides an alignment signal when misalignment between the lathe and an axis of rotation of the brake disk has been reduced below a prescribed amount. The alignment monitor provides a notice of the receipt of such signal for display to the operator, indicating that it is appropriate to proceed, and provides an indication for storage in a temporary memory to be included in the record for the current cutting operation; this indication can be simply an indication that the misalignment is sufficiently small or a value for the amount of lateral runout that will be created in the machined disk due to the misalignment.
Figure 8:
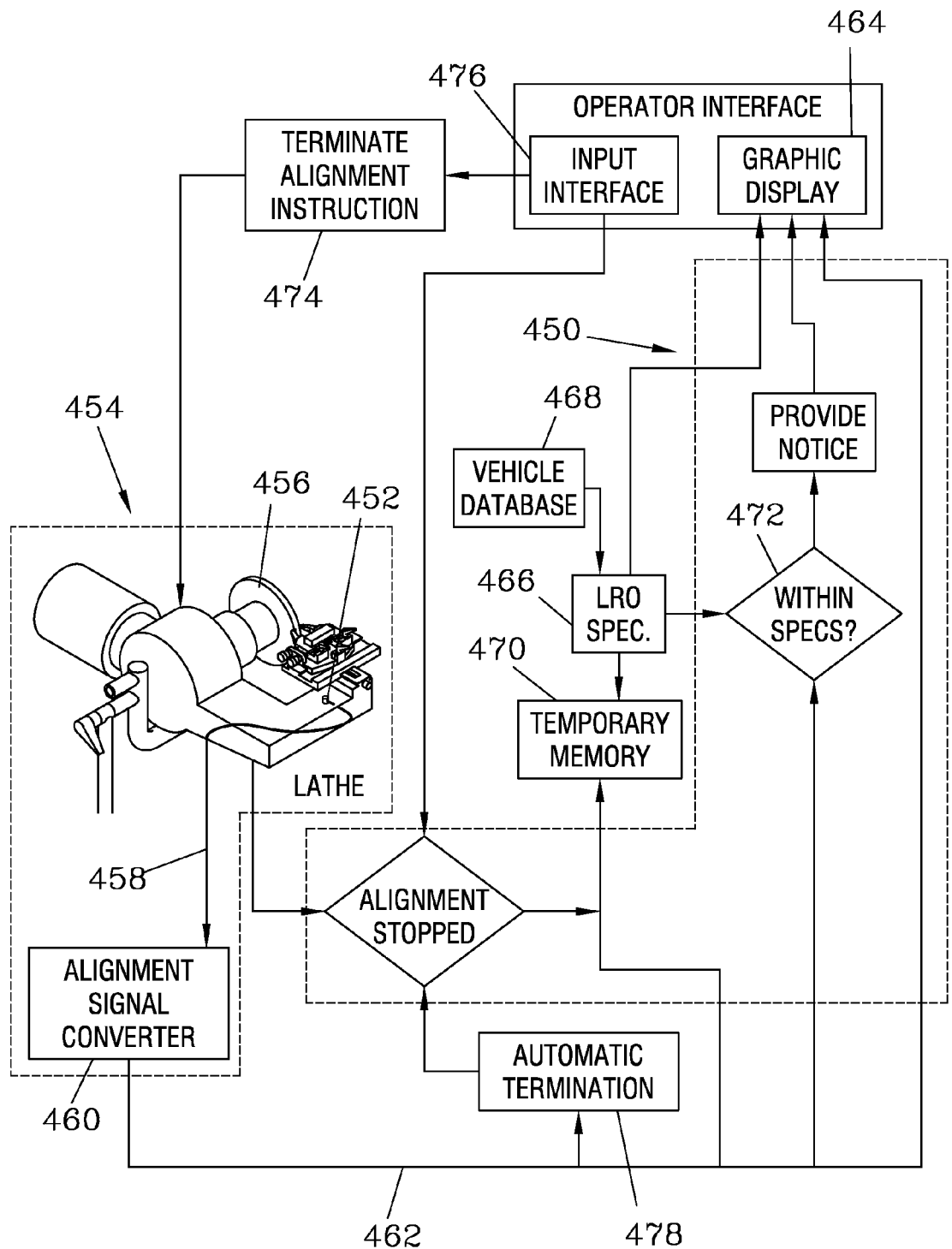
FIG. 8 is a schematic illustration of an alignment monitor for use with a dynamic automatic alignment system such as taught in U.S. Publication 2009/0107309. Such an alignment system provides a value for the resulting lateral runout of the brake disk, and this value is compared to the manufacturer's specification for the vehicle and wheel position selected. The alignment monitor provides the lateral runout value and the result of the comparison for display to the operator and for storage in a temporary memory when the alignment procedure is stopped, either automatically or by the action of the operator.

FIGS. 7 and 8 are schematic illustrations for two embodiments of alignment state monitors for hub-mounted lathes, these alignment monitors operating at the time in the disk-turning procedure when the lathe has been mounted onto the wheel hub of the vehicle and is to be aligned with axis of rotation of the brake disk. Typically, after a vehicle and wheel position have been selected as discussed above, a sequencing routine prompts the operator to perform an alignment procedure. The details of how the operator proceeds in the next segment of the operation depend, in large part, on the type of lathe employed.

FIG. 7 schematically illustrates an alignment state monitor 400 for a system having a brake lathe 402 that automatically aligns itself with a brake disk 404 in a dynamic manner. Automatic on-vehicle lathes of this type are taught in U.S. Pat. No. 6,101,911 and the family of related patents. For such a lathe 402, the alignment is automatic and is adjusted until a prescribed level of alignment has been achieved, and the lathe 402 provides an alignment signal 406 in the form of a pass/fail signal; a "pass" signal indicates that the alignment is acceptable, where the misalignment of the lathe 402 and the disk 404 does not exceed a design tolerance allowed, and it is appropriate for the operator to proceed to the next stage of operation. When such an alignment state monitor 400 is employed, the design tolerance for determining when to stop further adjustment is typically expressed as a value of lateral runout that would result if the disk 404 is machined under the current state of alignment. Such an automatic procedure removes any element of judgement on the part of the operator as to when to terminate the aligning process and move on to the subsequent steps of preparing the disk, and the prescribed level of alignment is selected such that the corresponding value of lateral runout will be less than the specified maximum value for all vehicles expected to be processed. Thus, for the alignment state monitor 400, the operator need not make any selection of vehicle or wheel position prior to performing the alignment operation. Failure to meet the prescribed level of alignment, as indicated by a "fail" signal for the alignment signal 406, typically indicates a problem that will need to be addressed by the operator, such as incorrect mounting of the lathe to the wheel hub. When the alignment is to be adjusted dynamically, it is preferred for the alignment state monitor 400 to employ a microprocessor (not shown) that is positioned on the lathe 402 to enable it to receive and process sensor signals in a real-time manner; thus, the alignment monitor typically employs a separate microprocessor from that employed by the reporting system to control routines and the collection and storage of data generated during the machining process.

For the lathe 402 which provides only a pass/fail alignment signal 406, an operator interface 408 providing an input interface 410 and a graphic display 412, allows the operator to initiate the alignment process and monitor its result. In the illustrated embodiment, the operator uses the input interface 410 to trigger an alignment initiation module 414 that starts the automatic alignment procedure of the lathe 402 and directs a sequencing routine 416 to cause an appropriate graphic screen to be loaded from a display graphic library 418 into the graphic display 412. The selected graphic screen could replace the previously-displayed screen or could be a smaller screen superimposed thereon. It should be appreciated that the initiation of the alignment procedure could be initiated by the operator directly activating a control on the lathe 402, rather than through the operator interface 408. Alternatively, the lathe 402 could be designed to perform the alignment automatically when its motor is turned on after the lathe 402 is mounted to a wheel hub.

The alignment signal 406 is a pass/fail signal and an appropriate indicator is displayed on the graphic display 412. The alignment signal 406 is monitored by a signal monitor 420 and, when the signal 406 indicates that the prescribed level of alignment has been attained, an appropriate alignment indication 422 can be recorded into a current cut register 424 of a temporary memory 426. The alignment indication 422 can be simply an indicator of whether or not the alignment procedure was successfully completed, or could be a value for the default lateral runout value that is used by the lathe 402 to automatically terminate the alignment process. Regardless of the particular alignment indication 422 stored in the current cut register 424, when the alignment signal 406 provides a "pass" indication, the signal monitor 420 activates a notice generator 428 to display an "alignment complete" message on the graphic display 412, serving as a prompt to the operator to begin adjusting the positions of tool bits of the lathe 402 to set the depth of cut. One limitation of the alignment state monitor 400 is that the actual runout of the disk will only be approximated with an upper limit, and thus the alignment state monitor suffers from providing only limited accuracy.

FIG. 8 illustrates an alternative embodiment of an alignment state monitor 450, which is a real-time alignment monitor that provides greater accuracy and, in some cases, can allow the operator to interrupt the automatic alignment process to reduce the alignment time. The alignment state monitor 450 employs a high-resolution alignment sensor 452, such as an angular rate sensor, having sufficient resolution to provide a numerical value representing the amount of misalignment between a lathe 454 and a brake disk 456. When such is provided, while the lathe 454 makes adjustments dynamically, the operator may, based on experience and the requirements specified by the manufacturer, select a cut-off point for alignment that differs from the default level. Such lathes are taught in U.S. Publication 2009/0107309 A1. In this embodiment, the signal provided by the alignment sensor 452 in the lathe 454 is a high-resolution alignment signal 458 that is suitable for processing by a convertor 460 of the lathe 454 in order to provide a lateral runout signal 462 that corresponds to the lateral runout for the disk 456 that would result if the disk 456 were machined under the current state of alignment.

The lateral runout signal 462 is provided to a graphic display 464 where it can be digitally and/or graphically displayed, the graphic display 464 again showing an appropriate display screen selected by a sequencing routine from a graphic display library (neither shown in FIG. 8). A maximum allowable lateral runout specification 466 for the selected vehicle and wheel position is obtained from a vehicle database 468 in a manner such as discussed earlier, and in this embodiment the specification 466 is stored in a temporary memory 470 from which it can be presented to the graphic display 464 to allow the operator to make a comparison with the runout signal 462; preferably, both the currently-indicated lateral runout value and the specification 466 are graphically displayed to allow visual comparison. An alignment check 472 is made by the alignment state monitor 450 to make a determination of whether the lateral runout value currently indicated by the signal 462 is less than the allowable specification 466 and to provide a notice of such determination to the graphic display 464 to aid the operator in making a decision whether or not to manually terminate the alignment process.

If the operator decides to terminate the alignment procedure manually using a "terminate alignment" instruction 474, this option is done through an input interface 476 and, when the alignment process is stopped, the current value of the lateral runout signal 462 is stored in a temporary memory 470 as the lateral runout that will result from machining the disk 456. In the event that the operator chooses not to manually terminate the alignment procedure, the lathe 454 will continue the alignment procedure until the alignment reaches the prescribed level, at which time the alignment process is stopped by an automatic alignment termination 478 and, again, the current value of the lateral runout signal 462 is stored in the temporary memory 470. In either case, the lateral runout value can be stored in an appropriate location in the temporary memory 470 that is provided for collecting data on the current cutting operation as it is generated by the reporting system. If desired, an indication of whether or not the alignment meets the specification as determined by the alignment check 472 can be included in the collected data.

While the discussion of FIG. 8 has been made in terms of a lathe 454 that adjusts the alignment dynamically to provide a real-time representation of the misalignment to allow the operator to interrupt the alignment process when appropriate, it should be noted that other on-vehicle lathes employ alignment adjustment mechanisms that provide a numerical value for the lateral runout after the alignment procedure has been completed. Such lathes can similarly provide the resulting lateral runout value to an alignment monitor for storage as part of the data to be reported for the cutting operation.

Figure 9:
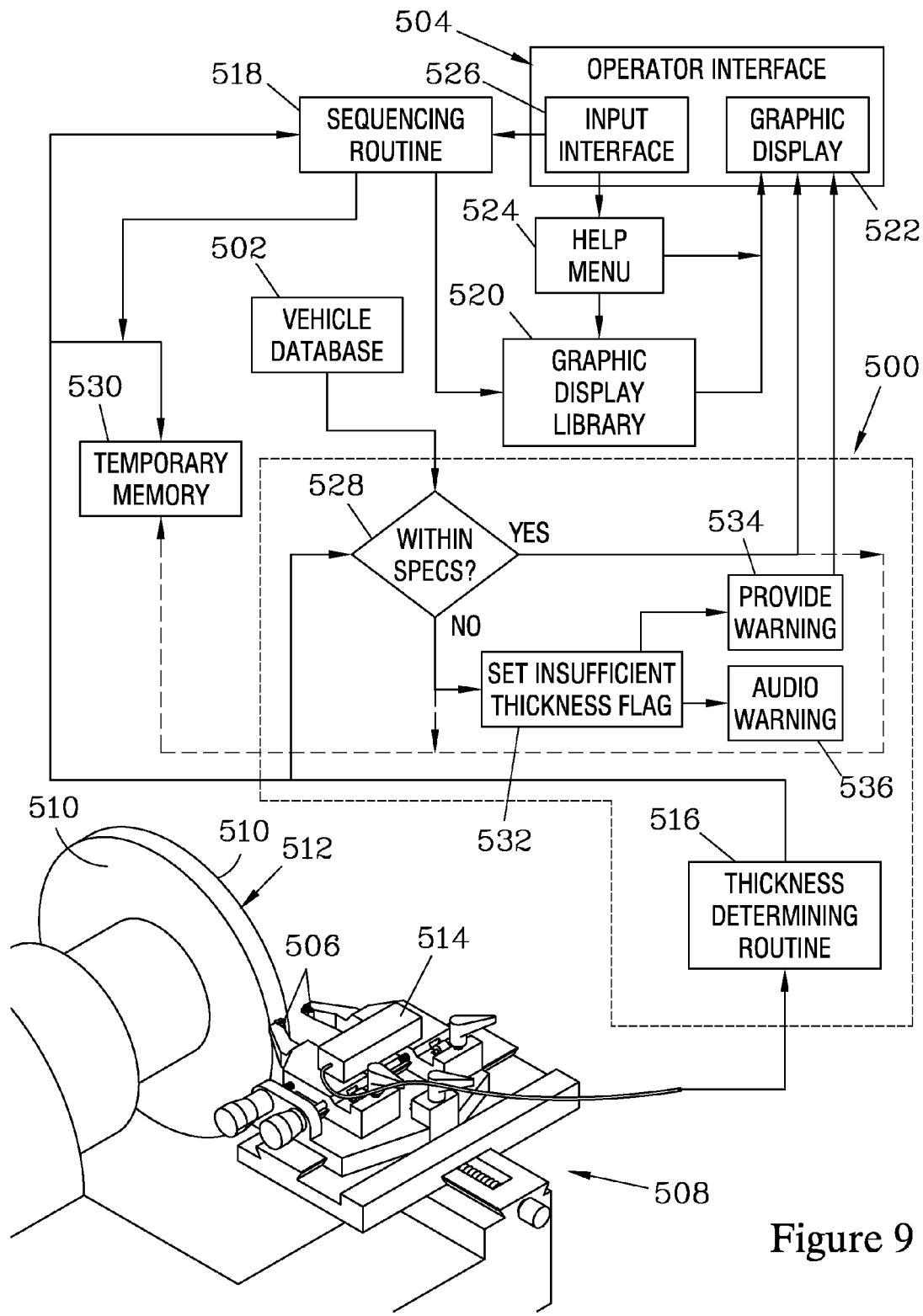
FIG. 9 is a schematic illustration of a thickness monitoring routine that can be employed by the reporting system of the present invention to provide an indication of the current separation between the tool bits of the lathe, which is the thickness of the brake disk that will result, and for making a comparison of the thickness and an inputted thickness specification. Warnings are provided to the operator when the thickness monitor sets an "insufficient thickness" flag to indicate when the current separation is not great enough to meet the manufacturer's minimum thickness specification.

FIG. 9 is schematic diagram illustrating one embodiment of a thickness monitor 500 for use as part of a reporting system of the present invention, the thickness monitor 500 illustrated being designed for use in a system having access to a vehicle specification database 502 from which appropriate brake disk specifications, including a minimum thickness value, can be selected by an operator through use of an operator interface 504. The thickness monitor 500 can be activated automatically when the lathe operator adjusts the positions of tool bits 506 of a lathe 508, the tool bits 506 being positioned in order to set an appropriate depth of cut to machine surfaces 510 of a brake disk 512 to reduce lateral runout of the brake disk 512 to an acceptable level and/or to recondition the disk surfaces 510. When the lathe 508 is a hub-mounted disk brake lathe, this procedure is typically started once the alignment is completed as is discussed above.

In the depth-setting procedure, the operator adjusts the position of the tool bits 506 to bring each into continuous cutting contact with its associated disk surface 510, and typically advances each of the tool bits 506 somewhat further to assure that cutting contact is maintained when the tool bits 506 are subsequently traversed across the disk surfaces 510 during the actual machining process. A thickness sensor 514 responds to the adjustment of the position of the tool bits 506, and generates signals that are processed by a thickness determining routine 516 to provide an indication of the separation between the tool bits 506, this separation corresponding to the thickness of the disk 512 that will result from machining with the tool bits 506 at their current separation. The thickness sensor 514 illustrated in FIG. 9 is a gauge that is positioned to respond directly to the relative motion of the tool bits 506 with respect to each other, such as taught in U.S. Pat. No. 6,363,821; in such cases, the thickness determining routine 516 need only suitably format and scale the signals to provide an indication of the separation. It should be appreciated that other sensors could be employed, such as sensors that respond to motion of the controls employed to adjust the positions of the tool bits 506, such as taught in U.S. Pat. No. 5,765,457, in which case the thickness determining routine must correlate the motion of the control to a corresponding change in position of each of the tool bits and then calculate the separation.

Regardless of the nature of the thickness sensor 514 and the thickness determining routine 516, when a change in the indicated thickness is first detected, it is convenient for this detection to cause a sequencing routine 518 to select an appropriate screen from a graphic display library 520 for presentation on a graphic display 522 which is part of the operator interface 504.

While not necessary, it can be convenient to provide a help menu 524 to accompany the system, where the help menu 524 can be selectively activated by the operator through an input interface 526, which is part of the operator interface 504, if needed to cause instructional material on the proper procedure for setting the depth of cut to be displayed on the graphic display 522. When such is provided, the selection of instructional materials offered on the help menu 524 should be made responsive to the sequencing routine 518 so that the selection offers only instructions appropriate to the current stage of lathe operation. It should be appreciated that similar instructional materials could be made available at other stages in the procedure, such as when attaching a hub-mounted lathe to a vehicle or when adjusting the alignment of such a lathe.

As the tool bits 506 are brought into contact with brake disk surfaces 510 to set the depth of cut, their separation as indicated by the thickness determining routine 516 is provided to a comparator 528 of the thickness monitor 500. The indicated separation is preferably also presented to the operator, numerically and/or graphically, on the display 522. The comparator 528 compares the separation value to a minimum thickness specification that has been selected from the vehicle database 502; this value can also be presented on the display 522. While FIG. 9 schematically shows the specification information being provided directly to the comparator 528 from the vehicle database 502 from which it has been extracted, more typically the specification will have been previously obtained and stored at a convenient location in a temporary memory 530, as briefly discussed in the discussion of FIG. 4.

If the thickness indicated by the current separation is less than the specification value, the comparator 528 sets an "insufficient thickness" flag 532, and can provide a corresponding warning 534 for presentation to the operator via the graphic display 522. The "insufficient thickness" flag 532 and warning 534 provide notice of failure to meet the minimum thickness specification. This warning provides the operator with notice that continuing the machining process with the tool bits 506 at their current separation will not result in the machined brake disk 512 meeting specifications. Accordingly, the operator can correct this situation by either setting the tool bits 506 to a greater separation, if such positioning of the tool bits 506 is still sufficient to correct lateral runout of the brake disk 512, or by replacing the brake disk 512. Since the operator may set the depth of cut while visually monitoring the cutting action of the tool bits 506 on the brake disk 512 to ascertain when continuous contact around the disk surfaces 510 has been achieved, it is preferred to also provide an audio warning 536 to advise the operator when the current separation becomes insufficient to meet the thickness specification. In fact, it may be helpful for the thickness monitor 500 to provide audio cues to the operator indicating when the separation is approaching the minimum as the tool bits 506 are moved to a smaller separation when setting the depth of cut.

The prompt for further action provided to the operator in response to the "insufficient thickness" flag 532 warning that the separation of the tool bits 506 is insufficient depends on the data to be reported. In some situations, the prompt could instruct the operator to stop the machining procedure and replace the disk 512. However, in many cases it is desirable to provide a record that the disk 512 lacks sufficient thickness to be resurfaced, such as when the disk is to be replaced under warranty. In such cases, the prompt can instruct the operator to make a short validation cut on the disk 512 with the tool bits 506 at their current separation to provide a measurement of the thickness of the disk 512 which would result from machining, but without requiring the operator to resurface the entire disk 512. Recording such a validation cut is discussed further below in the description of FIGS. 14 and 15. Alternatively, the system could wait until such time as the operator is actually cutting the disk 512 before providing a notice to the operator that the disk 512 is too thin, thereby prompting the operator to partially machine the disk 512 provide a record of insufficient thickness before providing the operator with notice that the disk 512 should be replaced. In the latter case, the notice that the thickness is insufficient should provide a prompt to the operator to immediately stop further machining of the disk surfaces 510.

The indicated separation provided by the thickness determining routine 516 during the actual machining process is provided to the temporary memory 530 to be included in a report of the machining operation when cutting has been completed. The recording of the thickness in the temporary memory 530 could be made by the sequencing routine 518 when it is determined by the system that cutting of the disk surfaces has commenced or when such cutting is indicated as being completed. An indication of whether or not the indicated thickness meets the selected thickness specification from the vehicle database 502 should also be included. The determination of when the cutting procedure has been completed is discussed below with regard to FIGS. 10-13.

Figure 10:
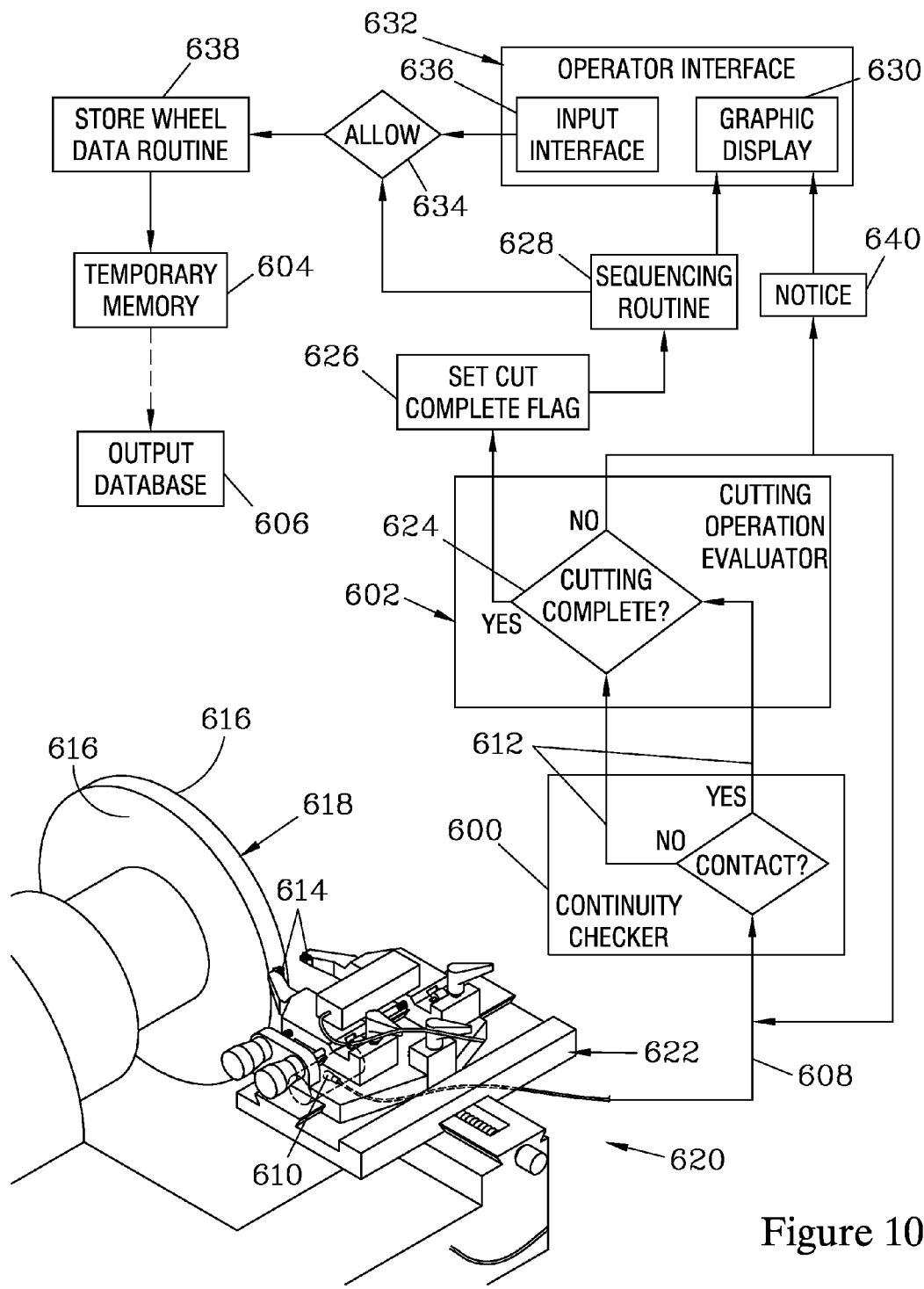
FIG. 10 is a schematic illustration of the function of a cutting operation evaluator and associated continuity checker that monitor signals from a sensor responsive to contact between the tool bits of the lathe and the disk surfaces. The continuity checker processes these signals in a time-averaged manner to provide an indication of when the tool bits are in continuous contact with the disk surfaces. From the signal provided by the continuity checker, the cutting operation evaluator determines when active cutting of the disk has been sufficiently established and when, after such time, such cutting has ceased, in order to determine when a cutting operation should be considered complete. The cutting operation evaluator sets a flag to indicate when a cutting operation has been completed, and the flag is provided to a sequencing routine to cause it to allow an option for the operator to record the data collected for the current cutting operation as a validated record of such.

FIG. 10 is a schematic diagram of the interaction of a continuity checker 600 with a cutting operation evaluator 602, these elements collectively cooperating to control the access of the option for the operator to have the data collected in a temporary memory 604 stored as a record for reporting to an output database 606.

In this embodiment, the continuity checker 600 processes contact signals 608 generated by a contact sensor 610 in an incremental manner to form time-averaged continuity signals 612 that are indicative of whether or not tool bits 614 are in substantially continuous contact with disk surfaces 616 of a brake disk 618. The continuity checker 600, while it processes the contact signals 608 in such a manner as to provide the indication of substantially continuous contact, it may do such in different manners. The simplest is to do such by a simple segment-by-segment analysis, while more sophisticated techniques group the segments after individual analysis to follow the group dynamics in assessing whether the contact is substantially continuous. Techniques of the latter type can provide a signal representing continuous contact only after a time delay, such that the time-averaged continuity signal 612 is indicated when such contact has been sufficiently established as to reliably indicate that the tool bits 614 are actively machining the disk surfaces 616 as they are traversed thereacross.

One suitable continuity checker of the latter type, which employs a vibration sensor as a contact sensor is taught in pending application Ser. No. 12/639,040, incorporated herein by reference. This continuity checker evaluates the signals from the vibration sensor in a time-averaged manner so as to filter out signals resulting from transient vibrations, and provides an inherent timing function to distinguish actual cutting contact from transient contact, such as that which result when the operator sets the depth of cut. For the remaining discussion of the embodiment shown in FIG. 10, the discussion of the contact sensor 610 will be in terms of a vibration sensor, of which one very effective sensor is a microphone coupled to a lathe 620 on which the tool bits 614 are provided.

The contact signal 608 from the vibration sensor 610 is averaged over small time segments and grouped. An average signal level for the grouped time segments is calculated and the average signal level for each segment is compared to the group average for consistency, to reduce the possibility of erroneous contact indications arising due to a transient noise spike. The check for consistency, to determine whether the signal level for the segment falls within a defined band around the group average, is made in addition to a check of whether the signal level is above a predefined threshold level for ambient noise; the check against background noise can be made either for the individual segments or for the group average. The results of whether the signal levels for the segments in the group meet the criteria for determining that continuous contact of the tool bits 614 with the disk surfaces 616 is occurring can be appropriately weighted and counted in an accumulator, with the content of the accumulator being used by the continuity checker 600 to determine whether or not continuous cutting contact has been reliably established.

In one such weighting and counting scheme, for each segment where the signal level falls within a defined band around the interval average, a value of +1 is added to a counter in the accumulator until it hits an upper limit. If the value for the sample is outside this range, then a value of −1 is added to the counter until such time as the counter reaches zero. However, before these segment signal levels are checked, if the group average is less than the specified threshold level, then all segments are assigned a value of −1 for the counter. Alternative counting schemes are discussed in the '040 application. After an initial startup time, when the count is below a preset value, then it is assumed that cutting is not occurring or, at best, is discontinuous, and if the count is above a present value, it is assumed that the tool bits 614 are in continuous cutting contact with the disk surfaces 616. The preset value of the counter for determining when contact is occurring can be set, relative to the number of segments in each group, such that multiple groups in which the majority of the segments meet the criteria are required to bring the count sufficiently high as to indicate cutting. This creates a delay time to provide the timing function that serves to assure that short term non-cutting operations, such as occurs when bringing the tool bits 614 into contact with the disk surfaces 616 to set the depth of cut, do not result in a false indication by the continuity signal 612 that the active cutting process has commenced. A delay may also occur after the tool bits 614 have completed their traverse of the disk surfaces 616, as a number of time segments for which the signal levels do not meet the criteria are required to reduce the value in the counter below a prescribed amount to indicate that continuous cutting contact has ceased.

Figure 11:
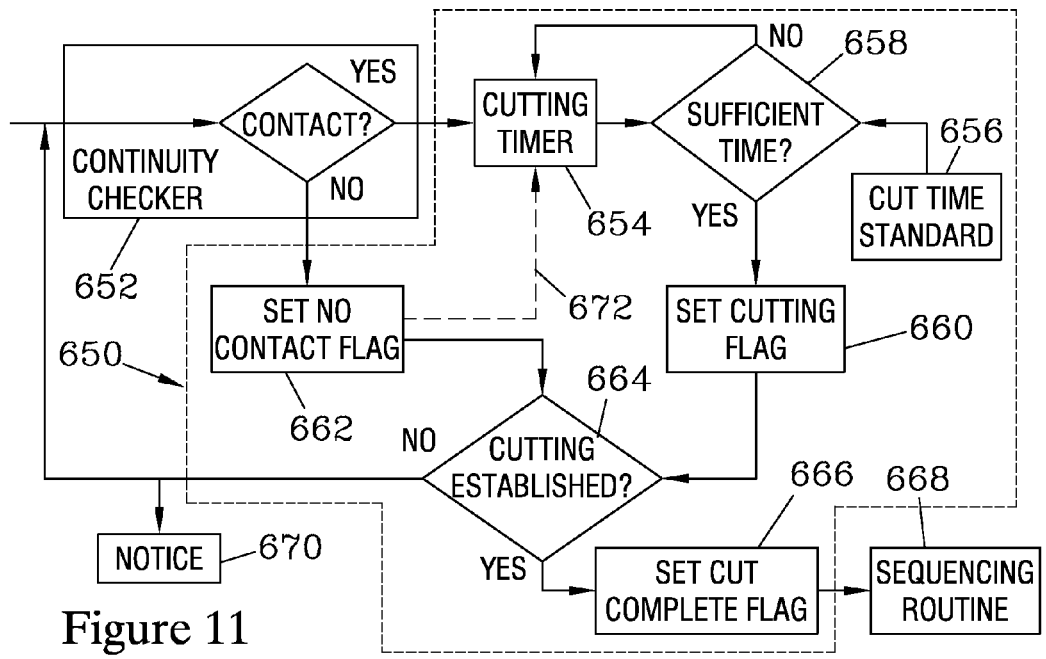
FIG. 11 is a schematic illustration of one example of a cutting operation evaluator, which is designed for use with a continuity checker that simply provides an indication of when the tool bits are in continuous contact with the disk surfaces. The cutting operation evaluator employs a cut timer to determine when such indicated contact has been sustained for a sufficient time as to reliably indicate that active cutting has commenced, at which time a "cutting established" flag is set. When cutting is not indicated by the continuity checker, a "not cutting" flag is set. If both flags are set, indicating that cutting has been established but is currently not occurring, such is interpreted as indicating completion of a cutting operation, and a "cut completed" flag is set by the cutting operation evaluator.
Figure 12:
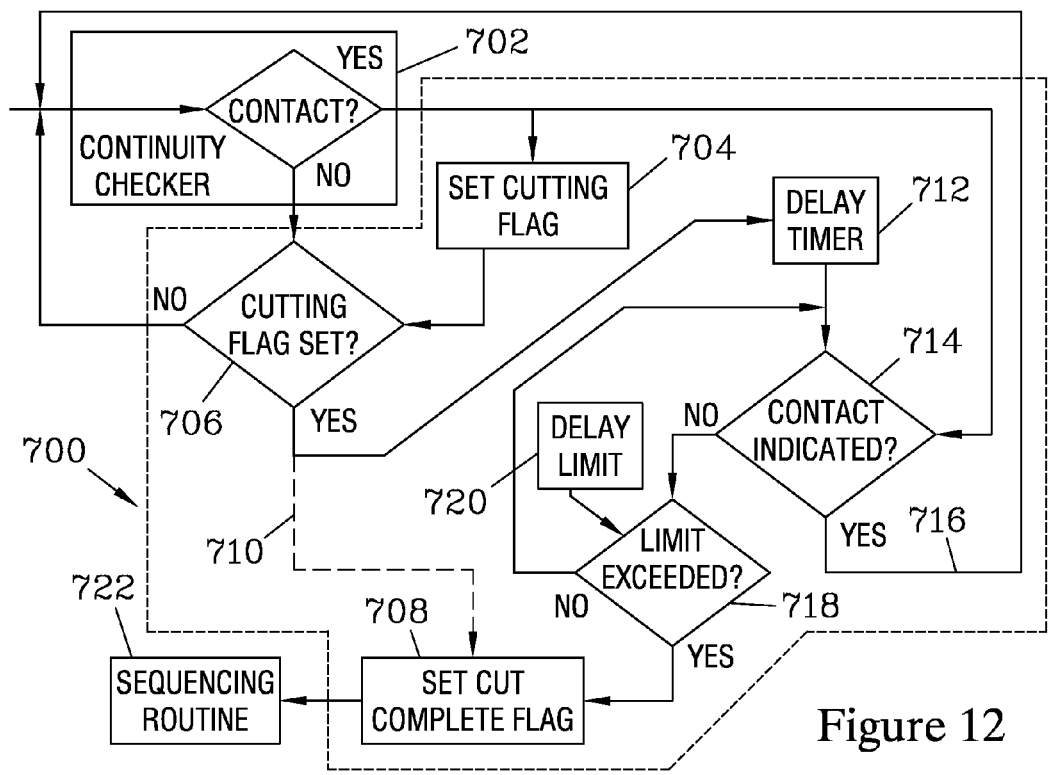
FIG. 12 is a schematic illustration of an alternative cutting operation evaluator, which is designed for use with a continuity checker that only provides an indication of continuous contact after such time as contact has been sustained for a sufficient period of time to reliably indicate active cutting; one such continuity checker is taught in U.S. application Ser. No. 12/639,040. In this case, a "cutting established" flag can be set by the cutting operation evaluator as soon as the contact signal is received from the continuity checker, and a check made when such a signal of no contact is received of whether or not the flag has been set. To assure that the cessation of indicated cutting actually corresponds to the end of the cutting operation, the cutting operation evaluator in this embodiment has a delay timer that prevents setting the "cut completed" flag in the event that a short interruption in cutting occurs.

Independent of the details of the continuity checker 600, the cutting operation evaluator 602 tracks the time-averaged continuity signals 612 that are output from the continuity checker 600 to determine when the lathe 620 has actively machined the brake disk 618 for a time to reliably establish that it is appropriate to report the data collected during the current machining process as a valid record of a completed cutting operation. The details of the cutting operation evaluator 602 will depend in part on the nature of the continuity checker 600. Examples showing details of some possible embodiments of such a cutting operation evaluator are shown in FIGS. 11 and 12. FIG. 11 illustrates one embodiment where the continuity checker simply provides an analysis that includes only recent values of the contact signals, and thus will not screen out the effects of transients resulting from startup of the cutting process. FIG. 12 illustrates an embodiment where the continuity checker evaluates the contact signal over a sufficient time to screen out transient effects of startup of cutting.

To better appreciate how the continuity checker 600 and the cutting operation evaluator 602 cooperate and function in the system illustrated, in part, in FIG. 10, a brief discussion of the machining of the disk 618 is provided below.

To turn the disk 618 to resurface the disk surfaces 616 that engage the brake pads of the vehicle when in service, the tool bits 614 of the lathe 620 are moved to a desired position where the machining is to be begun. When the tool bits 614 are positioned as desired, they are subsequently each advanced toward the disk surfaces 616 to provide a sufficient depth of cut to remove lateral runout from the disk 618 when machined, the separation between the tool bits 614 defining the thickness of the resulting brake disk 618. The indicated thickness, as well as any alignment indication to be reported for the cutting operation, are stored in the temporary memory 604. Also stored in the temporary memory 604 are inputted data identifying the vehicle type and the currently-selected wheel position.

To resurface the disk 618, the tool bits 614 are locked with respect to each other, and a tool head 622 to which they are mounted is advanced so that the tool bits 614 traverse across the disk surfaces 616. The cutting operation evaluator 602 monitors the time-averaged continuity signal 612 from the continuity checker 600 to make a determination of when the tool bits 614 have been in continuous contact with the disk surfaces 616 for a sufficient time to reliably establish that they are actually cutting the disk surfaces 616, and when such active cutting contact has stopped, at which time it is reasonable to assume that the tool bits 614 have traversed the disk surfaces 616. At such time, it is appropriate to store the information that is collected in the temporary memory 604 resulting from the turning of the disk 618 as part of a valid record of a machining operation performed by the lathe 620.

As pointed out above, examples of specific criteria that can be used to make such an evaluation of when active cutting has been established and subsequently ceased are discussed below in the descriptions of FIGS. 11-12. However, in all cases the determination requires that the continuity signal 612 from the continuity checker 600 indicate that the tool bits 614 are in continuous cutting contact with the disk surfaces 616, and that such continuous contact has been sustained for a sufficient length of time to reliably assure that it corresponds to actual cutting of the disk 618, rather than being the result of transient contact such as occurs when the operator first advances the tool bits 614 to set the depth of cut.

Additional timing of the indicated cutting may also be advisable to confirm that the length of time is sufficient to rely on the cut being complete, as well as a dwell time after the cutting is indicated as having ceased, to assure that the loss of cutting is not the result of temporary stoppage of the advancement of the tool bits 614, such as may occur when the operator adjusts a vibration attenuator.

While the continuity checker employing a microphone as a vibration sensor taught in the '040 application has been found effective, alternative contact sensors that are responsive to contact between the tool bits 614 and the disk surfaces 616 could be employed, such as sensors that detect electrical continuity in the manner taught in U.S. Pat. Nos. 6,729,212 and 7,640,832. However, the contact sensing taught in these references appears to only provide an indication of instantaneous contact or lack of contact, without the benefit of time-averaged processing provided by a continuity checker. Thus, the signals generated would need to be processed to provide a time-integrated signal over small time increments to eliminate the effect of interruptions in contact, such as might be caused by small irregularities in the disk surfaces 616. Such is not taught, suggested, claimed, or made obvious by the teaching of the '212 and '832 patents.

The check as to whether the indicated continuous contact has been sustained for a sufficient time to reliably indicate actual active cutting can, in part, be a function of the continuity checker 600 itself, when the continuity checker 600 is designed to only provide an indication of continuous contact after such contact has occurred for a period of time; alternatively, this function can be provided solely by the cutting operation evaluator 602. In cases where the initialization timing function to establish active cutting rather than merely transient continuous contact is inherent in the continuity checker 600 (one example being discussed in greater detail below), then the indication by the continuity signal 612 that continuous contact is occurring can be interpreted by the cutting operation evaluator 602 that such contact is sufficiently established, and a flag is set that such contact has been indicated. If this initialization timing function is not provided by the continuity checker 600, the cutting operation evaluator 602 can include a cutting initialization timer (one example being shown in FIG. 11) that is started when the continuity signal 612 first indicates continuous contact, the content of the cutting initialization timer then being compared to a specified cutting time standard; if the content of the cutting initialization timer is greater, the cutting operation evaluator 602 can set a flag to indicate that the continuous contact has been sufficiently established.

Regardless of whether the timing function to establish that continuous contact has been sufficiently sustained is provided by the continuity checker 600 or by the cutting operation evaluator 602, when the continuity signal 612 subsequently indicates that continuous contact is not occurring, as indicated by a cut completed comparison 624, then a "cut complete" flag 626 is set by the cutting operation evaluator 602. In response to the "cut complete" flag 626, a sequencing routine 628 provides an appropriate display to the operator via a graphic display 630 on an operator interface 632, and enables a gate 634 to allow the operator, through an input interface 636, to have the collected data in the temporary memory 604 stored as a valid record of the cutting operation for the selected wheel position, for eventual reporting to the output database 606. The particular scheme employed for storing the collected data depends on the structure of the temporary memory 604; examples of some possible schemes are discussed above in the descriptions of FIGS. 1-3, and another example is discussed below in the description of FIG. 16. In FIG. 10, the storage of the data is schematically represented by a store wheel data routine 638 that is enabled by the gate 634.

In the event that the duration of indicated continuous contact has not been established to be sufficient, a notice 640 of such condition can be provided to the operator via the graphic display 630, indicating that any cutting action detected has not been sufficiently established so as to warrant having the data in the temporary memory 604 archived. Typically, at such time the monitoring of the contact signal 608 is continued.

FIG. 11 illustrates one example of the operation of a simple cutting operation evaluator 650 that receives signals from a continuity checker 652 indicating whether or not substantially continuous contact is occurring between tool bits (not shown) and the surfaces of a brake disk (not shown). The continuity checker 652 in this example does not include a timing function, and thus the cutting operation evaluator 650 includes a cutting initialization timer 654 to distinguish whether indicated contact is due to a transient contact, such as occurs when advancing the tool bits to set the depth of cut, and sustained contact that results from actually machining the disk surfaces by traversing the tool bits thereacross.

The cutting initialization timer 654 is started when the continuity checker 652 first provides an indication that substantially continuous contact has occurred. The value of the cutting initialization timer 654 is periodically compared to a prescribed cut time standard 656, as indicated by a timer check 658. The cut time standard 656 is selected to be somewhat longer than the typical time of continuous contact that occurs when the depth of cut is set, so that an indication of continuous contact for a longer period can reliably serve to establish that active cutting of the disk surfaces has commenced. The cutting initialization timer 654 continues to run until such time as either the timer check 658 shows that the value in the cutting initialization timer 654 is at least as large as the cut time standard 656, in which case a "cutting initiated" flag 660 is set, or until such time as the continuity checker 652 provides an indication that cutting has ceased, as discussed below. In this embodiment, the cutting initialization timer 654 tracks the cutting from the start of cutting for a short period of time, to assure that the time of continuous contact is sufficiently long as to overcome problems associated with startup. Alternatively, the cut time standard could be set sufficiently long as to allow the timer 654 to serve as a proof timer, rather than employing a proof timer such as that discussed below in the description of FIG. 13.

In either case, when the continuity checker 652 provides an indication that cutting is not occurring, a "no contact" flag 662 is set, indicating continuous cutting is not currently occurring. This could be either because active cutting has not yet commenced or that, having commenced, such has subsequently ceased. The cutting operation evaluator 650 performs a cutting establishment check 664 that checks to determine whether both the "cutting initiated" flag 660 and the "no contact" flag 662 have been set. If both flags (660, 662) have been set, the cutting operation evaluator 650 sets a "cut compete" flag 666 to indicate to a sequencing routine 668 that it is appropriate to prompt the operator to report the collected data, as discussed above with regard to FIG. 10.

If one or both of the flags (660, 662) is not set, then the cutting operation evaluator 650 provides a notice 670 indicating that the collected data cannot be reported, as contact has not occurred for a sufficient time to establish that active cutting has commenced, such that the collected data can be relied upon to correspond to an actual cutting operation having been performed. The cutting operation evaluator 650 continues to monitor signals from the continuity checker 652 so as to respond in the event that continuous contact is subsequently indicated. In the event that contact has been previously indicated but has been insufficiently long, setting the "no contact" flag 662 additional logic not illustrated could cause the cutting operation evaluator 650 to reset the value in the cutting timer 654, as indicated in FIG. 11 by the arrow 672.

FIG. 12 illustrates an alternative cutting operation evaluator 700, which in this case is designed for use with a continuity checker 702 that incorporates a timing function such that it only provides an indication that contact is occurring when contact has been sufficiently established to distinguish transient contact from sustained contact due to actively cutting the disk surfaces. The continuity checker 702 can provide a periodic signal, indicating the current state of contact, or can simply provide a signal when the state changes, in which case it provides a signal when active cutting contact is initially established and another signal when such continuous contact has ceased. In either case, since the contact signal is only provided by the continuity checker 702 after cutting has been reliably established, the cutting operation evaluator 700 can set a "cutting initiated" flag 704 indicating the establishment of cutting as soon as the contact signal is received.

When the continuity checker 702 provides an indication that continuous cutting contact is not occurring, the cutting operation evaluator 700 makes a cutting check 706 to determine whether or not the "cutting initiated" flag 704 has been set. If the "cutting initiated" flag 704 has not been set, the cutting operation evaluator 700 simply takes no action, in which case the reporting system continues to monitor signals using the continuity checker 702. The lack of the "cutting initiated" flag 704 being set indicates that cutting of the brake disk has not yet commenced, and thus the system should remain in its current state.

At the time when the signal from the continuity checker 702 indicates that continuous cutting contact is not occurring, if the cutting check 706 determines that the "cutting initiated" flag 704 has been set, then the cutting operation evaluator 700 could simply treat such condition as indicating completion of the cutting operation and set a "cut complete" flag 708, as indicated by the arrow 710. However, the cutting operation evaluator 700 illustrated is provided with a delay timer 712 to accommodate short interruptions in the actual cutting procedure, such as may occur when the operator stops the feed mechanism of the lathe in order to make an adjustment to the position of a vibration attenuator.

When the delay timer 712 is provided, it is started when the cutting check 706 determines that the "cutting initiated" flag 704 has been set when the signal from the continuity checker 702 indicates that continuous cutting contact is not occurring. A contact check 714 is made to determine whether or not the signal from the continuity checker 702 indicates that continuous contact has again been established. If contact is again indicated, the cutting operation evaluator 700 resumes monitoring until such time as contact again ceases, as indicated by arrow 716. If contact is not indicated when the contact check 714 is made, then a delay time check 718 is made of whether or not the value in the delay timer 712 is less than a delay time limit 720. If the value in the delay timer 712 does not exceed the delay time limit 720, then the cutting operation evaluator 700 continues the count of the delay timer 712 and continues to periodically make the contact check 714. If contact is not again indicated, this loop continues until the delay time check 718 determines that the content of the delay timer 712 exceeds the delay time limit 720, at which time the cutting operation evaluator 700 sets the "cut complete" flag 708.

When the "cut compete" flag 708 has been set, this condition is communicated to a sequencing routine 722 to indicate that a sufficiently established cutting operation has been completed, and thus that it is appropriate for the collected data to be reported.

While either a cutting operation evaluator such as shown in FIG. 11 or a continuity checker such as taught in pending application Ser. No. 12/639,040 can provide a reliable indication of when active cutting has been established, further verification can be desirable to prevent operator errors or possible malfunction of the cutting operation evaluator.

Figure 13:
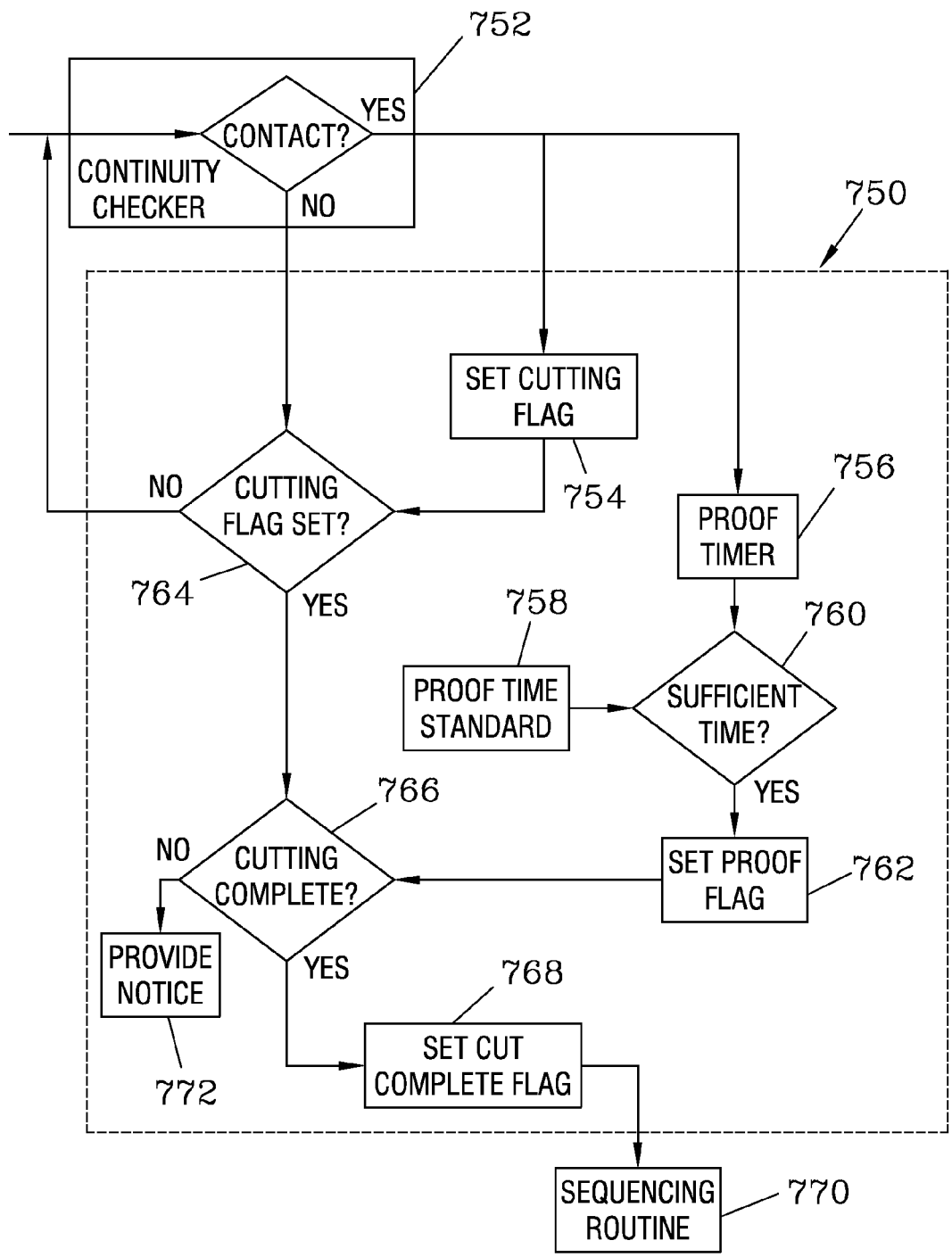
FIG. 13 is a schematic illustration of an alternative cutting operation evaluator for use with a continuity checker that provides an indication of sustained continuous contact. This cutting operation evaluator provides increased reliability by employing a proof timer to make a determination of whether the indicated sustained cutting has been maintained for a prescribed period of time, which is set somewhat less then the expected minimum time to machine a brake disk, before such indicated contact ceases. This additional delay before setting the "cut completed" flag to allow the collected data to be reported helps avoid operator error to assure that the data recorded corresponds to an actual cutting operation having been completed.

FIG. 13 is a schematic illustration of a more sophisticated cutting operation evaluator 750 which requires cutting to be sustained for an extended period before allowing a lathe operator to record the data that has been collected during the machining process. This extended period provides further verification that the data being reported corresponds to a cutting operation that has actually been performed.

The cutting operation evaluator 750 again receives signals from a continuity checker 752 that indicate whether or not tool bits of a lathe (not shown) have been reliably established to be actively cutting the surfaces of a brake disk (also not shown). The continuity checker 752 again provides the indication of whether or not continuous contact has commenced or ceased by analyzing signals from one or more contact sensors in a time-averaged manner over short intervals of time and processing the signals in such a manner as to distinguish sustained signals that indicate actual cutting from transient indications of contact, such as may occur when the tool bits are advanced to set the depth of cut.

When sustained continuous contact is first indicated by the continuity checker 752, the cutting operation evaluator 750 sets a "cutting initiated" flag 754 and starts a proof timer 756. The value of the proof timer 756 is periodically compared to a prescribed proof time standard 758, as indicated by a timer check 760, until such time as either the timer check 760 shows that the value in the proof timer 756 is at least as large as the time standard 758 or until such time as the continuity checker 752 provides an indication that cutting has ceased. If the timer check 760 determines that the value in the proof timer 756 is at least as large as the proof time standard 758, the cutting operation evaluator 750 sets a "proof" flag 762.

When the continuity checker 752 provides an indication that continuous cutting contact is not occurring, the cutting operation evaluator 750 performs a cutting check 764 that determines whether or not the "cutting initiated" flag 754 has been set. Again, if the "cutting initiated" flag 754 has not been set, the cutting operation evaluator 750 simply takes no action, since the "cutting initiated" flag 754 not being set indicates that cutting of the brake disk has not yet commenced. If the cutting check 764 determines that the "cutting initiated" flag 754 has been set, the cutting operation evaluator 750 makes a proof check 766 to determine whether the "proof" flag 762 has been set. If the "proof" flag 762 has been set, the cutting operation evaluator 750 sets a "cut compete" flag 768 to indicate to a sequencing routine 770 that continuous contact has been sustained for a sufficient time to deter falsification, and that it is appropriate for the collected data to be reported. If the "proof" flag 762 has not been set, indicating that the previously-indicated continuous cutting has not occurred for a sufficient time, the cutting operation evaluator 750 provides a notice 772 of such situation for presentation to the operator.

While the requirement that the cutting contact be indicated for an extended time can be helpful to deter falsification of records, it can present a problem in the event that the thickness of the brake disk is not sufficient that it can be machined to meet the specifications. In such cases, it may be desirable to have the operator make a short verification cut on the disk to provide a record that the disk is too thin, but without having the operator resurface the entire disk.

FIG. 14 is a schematic illustration of a cutting operation evaluator bypass 800 for reporting failure in the event that the disk to be machined is not sufficiently thick that it can be machined to meet the specifications. The cutting operation evaluator bypass 800 operates in conjunction with a continuity checker 802 that has the ability to screen out start-up instabilities in the contact signal, such as discussed above in the descriptions of FIGS. 10, 12, and 13. Thus, in this embodiment the continuity checker 802 distinguishes the signals resulting from short-term contact of the tool bits with the disk surfaces from the signals resulting from actual cutting and only provides a signal of cutting at a point that the tool bits are reliably indicated to be traversing the disk surfaces. When the signal of cutting is received, the bypass 800 performs a thickness flag check 804 to determine whether an "insufficient thickness" flag 806 has been set to indicate that the indicated thickness that will result from machining the disk does not meet the specification.

If the thickness flag check 804 determines that the "insufficient thickness" flag 806 has been set, then a notice 808 is provided to the operator to indicate that the cutting process can be discontinued and the data recorded. If the operator elects to do so, then the microprocessor employed in the system advances a sequencing routine 810 to a stage where reporting is allowed, and thus bypasses any need to continue machining. If this option is taken, then the disk will be left with a region of the surface un-machined, and this can be inspected after the disk is taken out of service for verification that the disk truly failed and needed replacement. In the event that no flag is set to indicate insufficient thickness, then the signal from the continuity checker 802 is monitored by a cutting operation evaluator 812 to determine when it is appropriate to allow the collected data to be recorded.

FIG. 15 illustrates another embodiment of a cutting operation evaluator bypass 850 for reporting failure of a disk, that differs from the embodiment illustrated in FIG. 14 in that it does not depend on a continuity checker 852 for establishing when the tool bits of the lathe are actively cutting the surfaces of a brake disk. Thus, the bypass 850 can be employed with the continuity checkers 852 and an associated cutting operation evaluator 854 independently of the details of the filtering scheme that is employed to distinguish active cutting contact as the tool bits traverse the disk surfaces from incidental contact that may initially occur. In the embodiment of FIG. 15, the cutting operation evaluator bypass 850 has a motion checker 856 for establishing when motion is occurring and the tool bits are advancing across the disk surfaces. The motion checker 856 can monitor signals from a sensor that responds directly to the position of a cutting head or responds to some element of the feed mechanism, such as a tachometer that senses rotation of an element of the drive for the feed mechanism. If the motion checker 856 indicates no motion of the tool bits, no action is taken in response to any contact signal provided by the continuity checker 852. If the motion checker 856 receives a signal establishing that motion is occurring, then a thickness flag check 858 is made to determine whether an "insufficient thickness" flag 860 has been set to indicate that the indicated thickness does not meet the specification for the brake disk. If the thickness flag check 858 determines that the "insufficient thickness" flag 860 has been set, then a notice 862 is provided to the operator to indicate that the cutting process can be discontinued and the data recorded at that time, allowing the system to advance a sequencing routine 864 to allow reporting. In the event that no flag is set to indicate insufficient thickness, then the monitoring of the continuity checker 852 is turned back to the cutting operation evaluator 854.

Figure 16:
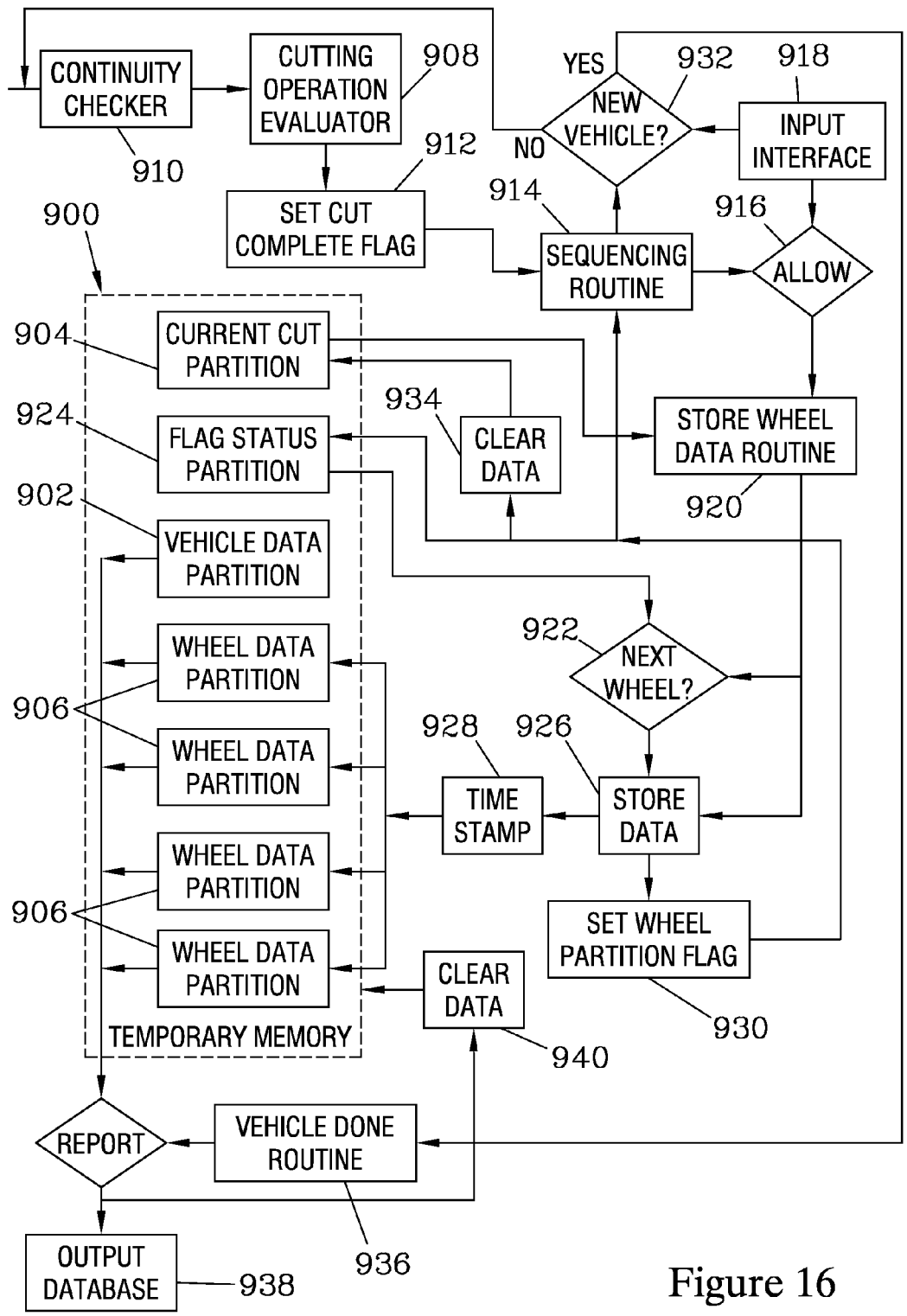
FIG. 16 is a schematic illustration of one scheme for storage and reporting that can be employed in the systems of the present invention. In this scheme, the wheel-specific data is collected in a current cut partition of a temporary memory, while the vehicle-specific data is collected in a vehicle data partition. When a cutting operation has been completed, a store wheel data routine can be activated to store the data in the current cut partition into the next available one of four wheel data partitions, after which the data in the current cut partition can be cleared or overwritten as new data is entered for a subsequent cutting operation. Wheel partition flags track which of the wheel data partitions have been filled. When all desired wheels of the vehicle have been processed and the operator desires to report the data or select a new vehicle, a vehicle done routine can be activated which transfers the data from the vehicle data partition and those wheel data partitions which are flagged as being filled to an output database, after which time the data in the temporary memory is cleared.

FIG. 16 illustrates one example of a memory scheme that can be employed in the system of the present invention for storing data as it is generated by the system and for storing records of valid cutting operations performed by a lathe. The system has a temporary memory 900 that is provided with a vehicle data partition 902 and a current cut partition 904. The vehicle data partition 902 serves for storing inputted vehicle-specific information, while the current cut partition 904 serves for temporarily storing inputted information on the wheel location currently being processed as well as data generated during the machining process, such as data provided by an alignment monitor (not shown) and a thickness monitor (not shown) such as discussed above. The temporary memory 900 also has four wheel data partitions 906 for storing the records of machining operations performed on each of four wheels of the current vehicle.

A cutting operation evaluator 908 analyzes the output of a continuity checker 910 to determine when it is appropriate to set a "cut complete" flag 912. The "cut complete" flag 912 is presented to a sequencing routine 914 that in turn activates a gate 916 that allows an operator, using an input interface 918, to activate a store wheel data routine 920. The store wheel data routine 920 makes a wheel partition selection 922 to determine the first available one of the wheel partitions 906 that does not have data stored therein. This determination is made based on the contents of a flag status partition 924 that keeps a record of which of the wheel data partitions 906 have already been used since the last time the temporary memory 900 was cleared.

Once the next available wheel data partition 906 has been selected, the store wheel data routine 920 activates a store data subroutine 926 that causes the data collected in the current cut partition 904 to be transferred into the selected wheel data partition 906, along with a time stamp 928 that provides a unique identifier for the stored record. The store data subroutine 926 also initiates a set wheel partition flag subroutine 930 that sets a flag for storage in the flag status partition 924 to indicate that the current wheel data partition 906 is no longer available.

The flag set by the set wheel partition flag subroutine 930 is also communicated to the sequencing routine 914. Upon receipt of such a flag indicating that a record has been stored for at least one wheel of the vehicle, the sequencing routine 914 allows a "new vehicle?" query 932 to be presented to the operator when the input of the operator is consistent with the actions taken upon completion of the work on the current vehicle; examples of such input might be when the operator inputs a command to have the collected data reported or when the operator initiates a routine to select a new vehicle. In either case, if there are further wheels to be processed on the current vehicle, the operator, through the input interface 918, selects "no" and the system prepares to collect data for a new cut. After the data in the current cut partition 904 has been stored by the store data subroutine 926, the flag provided by the set wheel partition flag subroutine 930 can activate a clear current data subroutine 934 that either actively clears the data in the current cut partition 904 or provides an indicator or flag allowing such data to be overwritten when new data is collected by the system.

In the event that all the wheels of the vehicle that are to be processed have been completed, the operator uses the input interface 918 to select "yes" in response to the "new vehicle?" query 932. This response initiates a vehicle done routine 936. The vehicle done routine 936 causes the data in the vehicle data partition 902 and the records contained in all the wheel data partitions 906 in which data has been stored to be transferred to an output database 938. After such transfer, a clear memory data subroutine 940 can clear the data contained in the vehicle data partition 902, the wheel data partitions 906, and the flag status partition 924. It should be noted that, in the event that the "new vehicle?" query is provided in response to the operator initiating a selection routine, and additional prompt for confirmation should be provided before clearing the data, as the operator may be selecting a new vehicle to correct a previously incorrect selection, and thus may want to change the selection of vehicle while retaining the collected data in the wheel partitions 906.

While the novel features of the present invention have been described in terms of particular embodiments and preferred applications, it should be appreciated by one skilled in the art that substitution of materials and modification of details can be made without departing from the spirit of the invention.

What we claim is:

1. A reporting system for an on-vehicle disk brake lathe which can be affixed with respect to a disk brake to be resurfaced, the on-vehicle disk brake lathe having,
    a cutting head assembly that supports a pair of tool bits for machining surfaces of the brake disk and which allows an operator to adjust the positions of the tool bits relative to the surfaces of the brake disk,
    a feed mechanism for moving the cutting head assembly so as to cause the tool bits to traverse the surfaces of the brake disk,
    a thickness monitor responsive to the positions of the tool bits to provide thickness signals which can be correlated to disk thickness after resurfacing,
    a contact sensor detecting contact between the tool bits and the disk and generating a contact signal responsive to the state of contact;
the system comprising:
    a microprocessor;
    an operator interface communicating with said microprocessor, said operating interface having,
        an operator input interface allowing an operator to cause information to be inputted to said microprocessor, including information identifying the vehicle and wheel position for the brake disk being serviced and at least a minimum thickness specification for the brake disk, and
        a display for presenting selected information generated by the system to the operator;
    an addressable temporary memory communicating with said microprocessor for storing the vehicle and wheel position identified by the operator and for storing data generated during the machining process;
    a thickness signal monitor responsive to the thickness signals for providing a disk thickness value for storage in said addressable temporary memory;
    a thickness comparison routine which sends an "insufficient thickness" flag to said temporary memory when the current thickness value fails to meet the inputted minimum thickness specification and sends a warning notice to said operator interface for presentation to the operator when the "insufficient thickness" flag is set;
    a signal continuity checker for processing contact signals generated by the contact sensor to provide time-averaged continuity signals;
    a cutting operation evaluator for analyzing the time-averaged continuity signals from said continuity checker to determine when a completed cutting operation has occurred and supplying a "cut completed" flag to said microprocessor to indicate such; and
    an archiving routine activated by the operator subject to said microprocessor granting permission after said cutting operation evaluator has set the "cut completed" flag, said archiving routine causing data from said temporary memory to be provided to an addressable report database,
        said addressable report database storing data including the selected vehicle and wheel position, the thickness value, and an unique cutting operation identifier generated by the archiving routine.

2. The reporting system of claim 1 further comprising;
    a store wheel data routine that stores the selected wheel information and the thickness value from said temporary memory as a record of a completed cutting operation and prepares said temporary memory to receive new data for a subsequent cutting operation; and
    a vehicle done routine that reports any collected data in said temporary memory which has not previously been reported for the currently-selected vehicle to said report database and which subsequently clears all information from said temporary memory.

3. The reporting system of claim 2 wherein the on-vehicle lathe attaches to a wheel hub on which the brake disk is mounted, and further wherein the brake lathe has,
    an alignment adjustment mechanism which adjusts the alignment of a rotation axis of the brake lathe with a rotation axis of the brake disk,
the system further comprising:
    an alignment state monitor for providing an indication as to the state of misalignment of the brake lathe which can be correlated to a value for lateral runout when the alignment adjustment mechanism has completed its alignment, said alignment state monitor providing an indication as to whether the lateral runout value exceeds the selected lateral runout specification.

4. The reporting system of claim 2 wherein the system is provided access to a vehicle specification database, the reporting lathe system further comprising:
vehicle/wheel selection routine for searching the vehicle specification database to provide selection options accessible from said operator input interface to assist the operator in uploading the appropriate data for the vehicle being serviced.

5. The reporting system of claim 3 wherein the system is provided access to a vehicle specification database, the reporting lathe system further comprising:
vehicle/wheel selection routine for searching the vehicle specification database to provide selection options accessible from said operator input interface to assist the operator in uploading the appropriate data for the vehicle being serviced,
wherein the specification data selected from the vehicle specification database includes a maximum lateral runout specification for the selected wheel position, and
further wherein said alignment state monitor is a real-time alignment monitor which employs an alignment sensor to provide a representative, real-time lateral runout value in response to motion of the brake lathe as the alignment adjustment mechanism is adjusted and which compares the lateral runout value to the selected lateral runout specification.

6. The reporting system of claim 5 wherein said alignment status monitor is a dynamic monitor employing an accelerometer.

7. The reporting system of claim 5 further comprising:
a vehicle identification number (VIN) entering device for presentation of the VIN of the vehicle to said microprocessor,
and further wherein said vehicle/wheel selection routine limits the selection options based on the presented VIN.

8. The reporting system of claim 5 further comprising:
a vehicle specification database searchable on year, make, and model; and
a search query for selection of the data for the vehicle being serviced.

9. The reporting system of claim 5 wherein said addressable temporary memory is partitioned into at least two partitions, one of said at least two partitions being for vehicle-specific information, and another of said at least two partitions is provided for storing all vehicle wheel processing data generated during the current cutting operation.

10. The reporting system of claim 9 further comprising:
a cutting operation evaluator by-pass triggered by the "insufficient thickness" flag which allows access to said archiving routine by the operator.

11. The reporting system of claim 10 wherein the lathe has an on-off control for activating and de-activating the feed mechanism, and further wherein said cutting operation evaluator by-pass is triggered subject to the further condition that the on-off control is in the "on" condition.

12. The reporting system of claim 1 wherein the contact sensor is a microphone providing an acoustical signal, and further wherein said signal continuity checker piecewise integrates and averages the acoustical signal to provide the time-averaged continuity signals.

13. The reporting system of claim 12 wherein said signal continuity checker processes the acoustical signal to check for consistency with an average value to reduce the effect of transient noise spikes.

14. The reporting system of claim 13 wherein said signal continuity checker weights the processed acoustical signal and employs an accumulator to provide the time-averaged continuity signals that are presented to said cutting operation evaluator with a cumulative indication of the weighted signals.

15. The reporting system of claim 13 wherein said cutting operation evaluator further comprises:
a cut initiation timer that runs while the time-averaged continuity signals provided by said continuity checker indicate that continuous contact is occurring; and
an initiation timer check that compares the content of said cut initiation timer to a specified minimum cut time standard and sets a "cutting initiated" flag after such time as the time-averaged continuity signals provided by said continuity checker have indicated contact for at least as long as the specified minimum cut time standard,
said cutting operation evaluator setting the "cut completed" flag when the time-averaged continuity signals provided by said continuity checker indicate that continuous contact is not occurring and the "cutting initiated" flag has been set.

16. The reporting system of claim 14 wherein said cutting operation evaluator further comprises:
a delay timer that runs when the time-averaged continuity signals from said continuity checker indicate that continuous contact is not occurring and the "cutting initiated" flag has been set,
said cutting operation evaluator delaying setting the "cut completed" flag until the delay timer has run for a specified minimum time.

17. The reporting system of claim 14 wherein said cutting operation evaluator further comprises:
a proof timer that runs when the time-averaged continuity signals from said continuity checker indicate that continuous contact is occurring after the "cutting initiated" flag has been set; and
a proof timer check that compares the content of said proof timer to a specified proof time standard, and sets a "cutting initiated" flag after such time as the time-averaged continuity signals provided by said continuity checker have indicated contact for at least as long as the specified minimum cut time standard,
said cutting operation evaluator only setting the "cut completed" flag when the content of said proof timer is at least as large as the specified proof time standard.

18. The reporting system of claim 4 further comprising:
a secondary memory for storing all data resulting from the processing of a current vehicle.

19. The reporting system of claim 4 wherein said addressable temporary memory has at least two partitions, said partitions comprising:
a current cut partition for storing wheel-specific data generated during the current cutting operation; and
at least one partition for storing vehicle-specific data and any data stored to record previous cutting operations performed on the current vehicle.

20. The reporting system of claim 19 wherein said addressable temporary memory has at least five partitions, comprising:
a vehicle data partition for storing information inputted to identify the current vehicle being processed; and
a wheel-data partition for each of the four wheel positions of the current vehicle for recording the data generated during the cutting operations performed on the current vehicle.

* * * * *